United States Patent
Xin et al.

(10) Patent No.: US 11,375,396 B2
(45) Date of Patent: Jun. 28, 2022

(54) SESSION MANAGEMENT METHOD, INTERWORKING METHOD, AND NETWORK APPARATUS

(71) Applicant: HUAWEI TECHNOLOGIES CO., LTD., Guangdong (CN)

(72) Inventors: Yang Xin, Shanghai (CN); Xiaobo Wu, Shanghai (CN); Weiwei Chong, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 167 days.

(21) Appl. No.: 16/790,730

(22) Filed: Feb. 13, 2020

(65) Prior Publication Data

US 2020/0187043 A1 Jun. 11, 2020

Related U.S. Application Data

(63) Continuation of application No. PCT/CN2018/096685, filed on Jul. 23, 2018.

(30) Foreign Application Priority Data

Aug. 14, 2017 (CN) .......................... 201710693980.1

(51) Int. Cl.
*H04W 28/02* (2009.01)
*H04M 15/00* (2006.01)
(Continued)

(52) U.S. Cl.
CPC ....... *H04W 28/0268* (2013.01); *H04M 15/66* (2013.01); *H04W 8/08* (2013.01); *H04W 28/12* (2013.01); *H04W 48/16* (2013.01)

(58) Field of Classification Search
CPC ... H04W 28/0268; H04W 8/08; H04W 28/12; H04W 48/16; H04W 36/14; H04W 76/11;
(Continued)

(56) References Cited

U.S. PATENT DOCUMENTS

2014/0029570 A1* 1/2014 Lee ..................... H04W 36/005
370/331
2014/0064210 A1 3/2014 Anchan et al.
(Continued)

FOREIGN PATENT DOCUMENTS

CN 101272600 A 9/2008
CN 101478743 A 7/2009
(Continued)

OTHER PUBLICATIONS

Ericsson: "Allocation of EPS bearer ID in 5GS",3GPP Draft; S2-174196, Jun. 25, 2017 (Jun. 25, 2017), XP051303051,total 8 pages.
(Continued)

*Primary Examiner* — Hassan Kizou
*Assistant Examiner* — Abdullahi Ahmed
(74) *Attorney, Agent, or Firm* — Leydig, Voit & Mayer, Ltd.

(57) ABSTRACT

Embodiments of this application provide a session management method, an interworking method between different systems, and a network apparatus. The session management method includes: when establishing a guaranteed bit rate (GBR) flow of a terminal device in a first communications system, determining, by a session management network element in the first communications system, that the GBR flow is a GBR flow required for handing over the terminal device from the first communications system to a second communications system; and establishing, by the session management network element for the GBR flow, a session context corresponding to the second communications system. The methods and the network apparatus are used to resolve a technical problem of resource waste existing in a handover method in the prior art.

18 Claims, 12 Drawing Sheets

(51) Int. Cl.
*H04W 8/08* (2009.01)
*H04W 28/12* (2009.01)
*H04W 48/16* (2009.01)

(58) Field of Classification Search
CPC ......... H04W 36/0066; H04W 36/0033; H04W 36/0027; H04M 15/66; H04L 12/14; H04L 12/1407
See application file for complete search history.

(56) References Cited

U.S. PATENT DOCUMENTS

| | | | |
|---|---|---|---|
| 2014/0087728 | A1 | 3/2014 | Avula |
| 2016/0183156 | A1 | 6/2016 | Chin et al. |
| 2018/0368047 | A1* | 12/2018 | Patil ................. H04L 45/38 |
| 2019/0261211 | A1* | 8/2019 | Wu .................. H04L 47/2441 |
| 2020/0112522 | A1* | 4/2020 | Dannebro ............ H04W 36/14 |
| 2020/0120538 | A1* | 4/2020 | Han ................. H04W 28/0263 |
| 2020/0128432 | A1* | 4/2020 | Youn ................ H04L 47/805 |
| 2020/0229059 | A1* | 7/2020 | Xu .................. H04W 28/02 |
| 2020/0267617 | A1* | 8/2020 | Larsen ............... H04L 69/322 |
| 2021/0289402 | A1* | 9/2021 | Ke .................. H04W 28/0268 |

FOREIGN PATENT DOCUMENTS

| | | |
|---|---|---|
| CN | 105075334 A | 11/2015 |
| CN | 107018542 A | 8/2017 |

OTHER PUBLICATIONS

Huawei: "TS 23.502: Discussion about QoS parameter mapping from 5GS to EPS and how to allocate TFT",3GPP Draft; S2-172012,Mar. 26, 2017 (Mar. 26, 2017), XP051247745,total 3 pages.
CATT: "TS 23.502: Discussion on EPS bearer ID allocation during inter-RAT handover from 5GS to EPS",3GPP Draft; S2-172175 TS 23.502,Mar. 26, 2017 (Mar. 26, 2017), XP051247901,total 6 pages.
Ericsson: "23.502: 5GC-EPC interworking",3GPP Draft; S2-170805,Feb. 13, 2017 (Feb. 13, 2017), XP051216926,total 6 pages.
NTT DOCOMO: "Comparison of solutions for EBI allocation",3GPP Draft; S2-174566,Jun. 25, 2017 (Jun. 25, 2017), XP051303411,total 13 pages.
Ericsson: "Options for UE context translation between 5GC and EPC",3GPP Draft; S2-171757,Mar. 26, 2017 (Mar. 26, 2017), XP051247497,total 3 pages.
Ericsson, "5G System details for PCC", SA WG2 Meeting #122, S2-174210, Jun. 26-30, 2017, San Jose Del Cabo, total 273 pages.
Ericsson, Allocation of EPS bearer ID in 5GS [online], 3GPP TSG SA WG2#122 S2-174196 , Jun. 30, 2017,total 8 pages.
CATT, PDU Session Modification procedures [online], 3GPP TSG SA WG2#118bis S2-170253 , Jan. 20, 2017, total 4 pages.
S2-174554 Intel et al.,"23.502: QoS mapping for 5GC-EPC interworking",SA WG2 Meeting #122,Jun. 26-30, 2017, San Jose Del Cabo, Mexico,total 11 pages.
S2-172049 Nokia,"23.502: Updates to EPS HO Call flow",3GPP TSG SA WG2 Meeting #120,Mar. 27-31, 2017, Busan, Korea,total 4 pages.
3GPP TS 23.502 V0.5.0 (Jul. 2017),3rd Generation Partnership Project;Technical Specification Group Services and System Aspects;Procedures for the 5G System;Stage 2(Release 15),total 148 pages.
S2-172012 Huawei,"TS 23.502: Discussion about QoS parameter mapping from 5GS to EPS and how to allocate TFT",SA WG2 Meeting #120,Mar. 27-31, 2017, Busan, Korea,total 3 pages.
S2-171608 NTT Docomo, Intel,"TS 23.502: Nx-based Handover procedure",SA WG2 Meeting #119,Feb. 13 -17, 2017, Dubrovnik, Croatia,total 3 pages.
S2-173065 China Mobile,"Proposals for HO procedure from 5GS to EPC with SR UE using Nx",SA WG2 Meeting #121,May 15-19, 2017, Hangzhou, China,total 4 pages.
S2-174495 China Mobile,"GBR bearer selection for SR UE HO from 5GS to EPC using Nx",SA WG2 Meeting #122,Jun. 26-3, 2017, San Jose Del Cabo, Mexico,total 4 pages.
3GPP TS 23.501 V1.2.0 (Jul. 2017),3rd Generation Partnership Project;Technical Specification Group Services and System Aspects-;System Architecture for the 5G System;Stage 2(Release 15),total 166 pages.
3GPP TS 23.401 V15.0.0 (Jun. 2017),3rd Generation Partnership Project;Technical Specification Group Services and System Aspects;General Packet Radio Service (GPRS) enhancements for Evolved Universal Terrestrial Radio Access Network (E-UTRAN) access(Release 15),total 386 pages.

* cited by examiner

SESSION MANAGEMENT METHOD, INTERWORKING METHOD, AND NETWORK APPARATUS

CROSS-REFERENCE TO RELATED APPLICATION

This application is a continuation of International Application No. PCT/CN2018/096685, filed on Jul. 23, 2018, which claims priority to Chinese Patent Application No. 201710693980.1, filed on Aug. 14, 2017. The aforementioned applications are hereby incorporated by reference in their entireties.

TECHNICAL FIELD

This application relates to the field of wireless communications technologies, and in particular, to a session management method, an interworking method between different systems, and a network apparatus.

BACKGROUND

In a 5th generation (5G) mobile communication technology network, to ensure interworking between the 5G network and a 4th generation (4G) mobile communication technology network or another network (such as a 2nd generation (2G) mobile communication technology network or a 3rd generation (3G) mobile communication technology network), a procedure similar to that of interworking between the 4G network and the 3G network or between the 4G network and the 2G network is used. For example, handover is performed by using a mobility management (MM) context mapping solution or a session management (SM) context mapping solution.

However, a resource waste problem exists in such a solution in which handover is performed through context mapping.

SUMMARY

Embodiments of this application provide a session management method, an interworking method, and a network apparatus, to resolve a technical problem of resource waste existing in a handover method in the prior art.

According to a first aspect, a session management method is provided. In the method, when establishing a guaranteed bit rate GBR flow of UE, a session management network element first needs to determine the GBR flow, to determine whether the GBR flow is a GBR flow required for handing over the UE from a first communications system to a second communications system. If determining that the GBR flow is the GBR flow required for handing over the UE from the first communications system to the second communications system, the session management network element establishes, for the GBR flow, a session context corresponding to the second communications system.

In the foregoing technical solution, when establishing a GBR flow, the session management network element needs to establish, for only a GBR flow that needs to be switched to the second communications system, a session context corresponding to the second communications system, and does not establish, for a GBR flow that does not need to be switched to the second communications system, a session context corresponding to the second communications system.

Correspondingly, the session management network element does not need to maintain the session context that is corresponding to the second communications system and that is of the GBR flow that does not need to be switched to the second communications system, so as to reduce resource consumption.

In a possible implementation, the session management network element determines, based on at least one of a policy and charging control PCC rule, an operator policy, and a data network name DNN, that the GBR flow is the GBR flow required for handing over the terminal device from the first communications system to the second communications system.

In the foregoing technical solution, the session management network element may determine, in a plurality of manners, whether the GBR flow is the GBR flow required for handing over the terminal device from the first communications system to the second communications system. For example, the session management network element may perform determining by using the PCC rule, or by using the operator policy, or with reference to the PCC rule, the operator policy, and the DNN. Therefore, the session management network element may flexibly select a determining method based on an actual situation.

In a possible implementation, the session management network element receives PCC rule information sent from a policy control network element, where the PCC rule information includes a PCC rule that is of the GBR flow and that is corresponding to the second communications system. The session management network element determines, based on the PCC rule information, that the GBR flow is the GBR flow required for handing over the terminal device from the first communications system to the second communications system.

In the foregoing technical solution, the session management network element may determine, by using the PCC rule received from the policy control network element, whether the GBR flow is the GBR flow required for handing over the terminal device from the first communications system to the second communications system. In this way, a computing amount of the session management network element may be reduced, and a processing speed of the session management network element can be accelerated.

In a possible implementation, the session management network element receives service information sent from the terminal device, and the session management network element determines, based on the service information, the operator policy, and the data network name DNN, that the GBR flow is the GBR flow required for handing over the terminal device from the first communications system to the second communications system.

In the foregoing technical solution, the session management network element may directly determine, by using the service information sent from the terminal device and with reference to the operator policy and the DNN, whether the GBR flow is the GBR flow required for handing over the terminal device from the first communications system to the second communications system. In this way, a time consumed for interaction between the session management network element and another network element may be reduced, thereby accelerating a processing speed of an entire communications system.

In a possible implementation, the PCC rule includes a GBR parameter, a multiple frequency band indicator MBR parameter, and an IP filter.

In the foregoing technical solution, the PCC rule includes different specific content, and the foregoing is merely several examples. This is not limited in this embodiment of this application.

According to a second aspect, a session management method is provided. In the method, a policy control network element receives service information from a terminal device or an application network element, and then generates policy and charging control PCC rule information based on at least one of an operator policy and a data network name DNN, the service information, and an interworking capability of the terminal device from a first communications standard network to a second communications standard network. The PCC rule information includes at least a PCC rule that is of the GBR flow and that is corresponding to a first communications system. The first communications system uses the first communications standard network, and a second communications system uses the second communications standard network. Finally, the policy control network element sends the generated PCC rule to a session management network element.

In the foregoing technical solution, the policy control network element may determine, in a plurality of manners, whether the GBR flow is a GBR flow required for handing over the terminal device from the first communications system to the second communications system. For example, the policy control network element may perform determining by using the operator policy, the service information, and the interworking capability of the terminal device from the first communications standard network to the second communications standard network, or by using the DNN, the service information, and the interworking capability of the terminal device from the first communications standard network to the second communications standard network, or based on the operator policy, the DNN, the service information, and the interworking capability of the terminal device from the first communications standard network to the second communications standard network. Therefore, the policy control network element may flexibly select a determining method based on an actual situation.

In a possible implementation, the PCC rule includes a GBR parameter, a multiple frequency band indicator MBR parameter, and an IP filter.

In the foregoing technical solution, the PCC rule includes different specific content, and the foregoing is merely several examples. This is not limited in this embodiment of this application.

According to a third aspect, an interworking method is provided. In the method, a session management network element in a first communications system first receives session context request information sent from an access management network element in the first communications system. The session context request information is used to obtain a session context that is of a terminal device in the first communications system and that is corresponding to a second communications system. Next, the session management network element determines whether a dedicated quality of service flow exists in a session corresponding to the session context request, and then sends, to the access management network element, the session context in which the dedicated quality of service flow exists.

In the foregoing technical solution, if the dedicated quality of service flow does not exist in the session, the session management network element does not need to send the session context to the access management network element. Therefore, a PDN connection to the session context in which the dedicated quality of service flow does not exist does not need to be established in the second communications system, thereby reducing signaling and channel resources.

In a possible implementation, if the session management network element determines that the dedicated quality of service flow does not exist in the session corresponding to the session context request, the session management network element releases the session in which the dedicated quality of service flow does not exist.

In the foregoing technical solution, if the dedicated quality of service flow does not exist in the session context, the session management network element directly releases the session, so as to further reduce channel resources.

In a possible implementation, if the session management network element determines that no service data flow SDF exists in a default quality of service flow in the session corresponding to the session context request, the session management network element releases the session in which no SDF exists in the default quality of service flow.

In the foregoing technical solution, if no SDF exists in the default quality of service flow in the session, that is, the session has no service, the session management network element directly releases the session, so as to further reduce channel resources.

In a possible implementation, if the session management network element determines that a service data flow SDF exists in the default quality of service flow in the session corresponding to the session context request, the session management network element sends, to the access management network element in the first communications system, the session context corresponding to the session in which the SDF exists.

In the foregoing technical solution, if the SDF exists in the default quality of service flow in the session, that is, the session still processes a service, the session management network element sends, to the access management network element in the first communications system, the session context corresponding to the session, so as to avoid omitting service data.

According to a fourth aspect, an interworking method is provided. In the method, an access management network element sends session context request information to a session management network element in a first communications system, where the session context request information is used to obtain a session context that is of a terminal device in the first communications system and that is corresponding to a second communications system. Then, the access management network element receives the session context sent from the session management network element, and a dedicated quality of service flow exists in a session corresponding to the session context.

In the foregoing technical solution, after the access management network element sends the session context request to the session management network element in the first communications system, the access management network element may receive only a context corresponding to the session in which the dedicated quality of service flow exists. In this way, a PDN connection to the session context in which the dedicated quality of service flow does not exist does not need to be established in the second communications system, so as to reduce signal and channel resources.

According to a fifth aspect, an embodiment of this application provides a network apparatus, and the network apparatus has functions for implementing behaviors of the session management network element in the method in the first aspect. The functions may be implemented by using hardware, or may be implemented by executing corresponding software by hardware. The hardware or the software includes one or more modules corresponding to the functions.

In a possible design, a structure of the network apparatus includes a processor and a transmitter, and the processor is configured to support the network apparatus in performing corresponding functions in the method in the first aspect. The transmitter is configured to support communication between the network apparatus and another device, and send information or an instruction in the method in the first aspect to the another device. The network apparatus may further include a memory. The memory is configured to be coupled with the processor. The memory stores a necessary program instruction and data.

According to a sixth aspect, an embodiment of this application provides a network apparatus, and the network apparatus has functions for implementing behaviors of the policy control network element in the method in the second aspect. The functions may be implemented by using hardware. A structure of the network apparatus includes a processor, a transmitter, and a receiver. The functions may alternatively be implemented by executing corresponding software by hardware. The hardware or the software includes one or more modules corresponding to the functions. The module may be software and/or hardware.

In a possible design, a structure of the network apparatus includes a processor and a transmitter, and the processor is configured to support the network apparatus in performing corresponding functions in the method in the first aspect. The transmitter is configured to support communication between the network apparatus and another device, and send information or an instruction in the method in the first aspect to the another device. The network apparatus may further include a memory. The memory is configured to be coupled with the processor. The memory stores a necessary program instruction and data.

According to a seventh aspect, an embodiment of this application provides a network apparatus, and the network apparatus has functions for implementing behaviors of the session management network element in the method in the third aspect. The functions may be implemented by using hardware, or may be implemented by executing corresponding software by hardware. The hardware or the software includes one or more modules corresponding to the functions.

In a possible design, a structure of the network apparatus includes a processor and a transmitter, and the processor is configured to support the network apparatus in performing corresponding functions in the method in the third aspect. The transmitter is configured to support communication between the network apparatus and another device, and send information or an instruction in the method in the third aspect to the another device. The network apparatus may further include a memory. The memory is configured to be coupled with the processor. The memory stores a necessary program instruction and data.

According to an eighth aspect, an embodiment of this application provides a network apparatus, and the network apparatus has functions for implementing behaviors of the access management network element in the method in the fourth aspect. The functions may be implemented by using hardware. A structure of a network apparatus includes a receiver, a transmitter, and a processor. The functions may alternatively be implemented by executing corresponding software by hardware. The hardware or the software includes one or more modules corresponding to the functions. The module may be software and/or hardware.

In a possible design, a structure of the network apparatus includes a processor and a transmitter, and the processor is configured to support the network apparatus in performing corresponding functions in the method in the fourth aspect. The transmitter is configured to support communication between the network apparatus and another device, and send information or an instruction in the method in the fourth aspect to the another device. The network apparatus may further include a memory. The memory is configured to be coupled with the processor. The memory stores a necessary program instruction and data.

According to a ninth aspect, an embodiment of this application provides a communications system, and the system includes the network apparatus described in the first aspect and the second aspect, and/or the network apparatus described in the third aspect and the fourth aspect.

According to a tenth aspect, an embodiment of this application provides a computer storage medium, configured to store a computer software instruction used to perform functions of the first aspect, any design of the first aspect, the second aspect, the third aspect, and the fourth aspect, and include a program designed for performing the methods in the first aspect, any design of the first aspect, the second aspect, the third aspect, and the fourth aspect.

According to an eleventh aspect, an embodiment of this application provides a computer program product, and the computer program product includes an instruction. When the instruction runs on a computer, the computer performs the methods in the first aspect, any design of the first aspect, the second aspect, the third aspect, and the fourth aspect.

According to a twelfth aspect, an embodiment of this application further provides a chip system, and the chip system includes a processor, configured to support a network apparatus in implementing the method in any of the foregoing aspects, for example, generating or processing data and/or information in the foregoing method. In a possible design, the chip system further includes a memory, and the memory is configured to store a program instruction and data that are necessary for the network apparatus. The chip system may include a chip, or may include a chip and another discrete device.

DESCRIPTION OF EMBODIMENTS

The following clearly describes the technical solutions in the embodiments of this application with reference to the accompanying drawings in the embodiments of this application.

Embodiments of this application provide a session management method and an interworking method between different systems, and the methods are applied to an interworking architecture having different systems. The interworking architecture specifically includes two different communications systems, such as a 5G network and a 4G network, and certainly may be other communications systems such as a new radio (NR) system, a Wireless Fidelity (WiFi) system, a Worldwide Interoperability for Microwave Access (WiMAX) system, a global system for mobile communications (GSM), a Code Division Multiple Access (CDMA) system, a Wideband Code Division Multiple Access (WCDMA) system, a general packet radio service (GPRS) system, a Long Term Evolution (LTE) system, an Long Term Evolution Advanced (LTE-A) system, a Universal Mobile Telecommunications System (UMTS), and a cellular system related to the 3rd Generation Partnership Project (3GPP). The inter-RAT system may be any two of the foregoing communications systems.

In addition, the interworking architecture is further applicable to a future-oriented communication technology. The systems described in the embodiments of this application are intended to describe the technical solutions in the embodiments of this application more clearly, and constitute no limitation on the technical solutions provided in the embodiments of this application. A person of ordinary skill in the art may know that with evolution of network architectures, the technical solutions provided in the embodiments of this application are also applicable to a similar technical problem.

Figure 1:
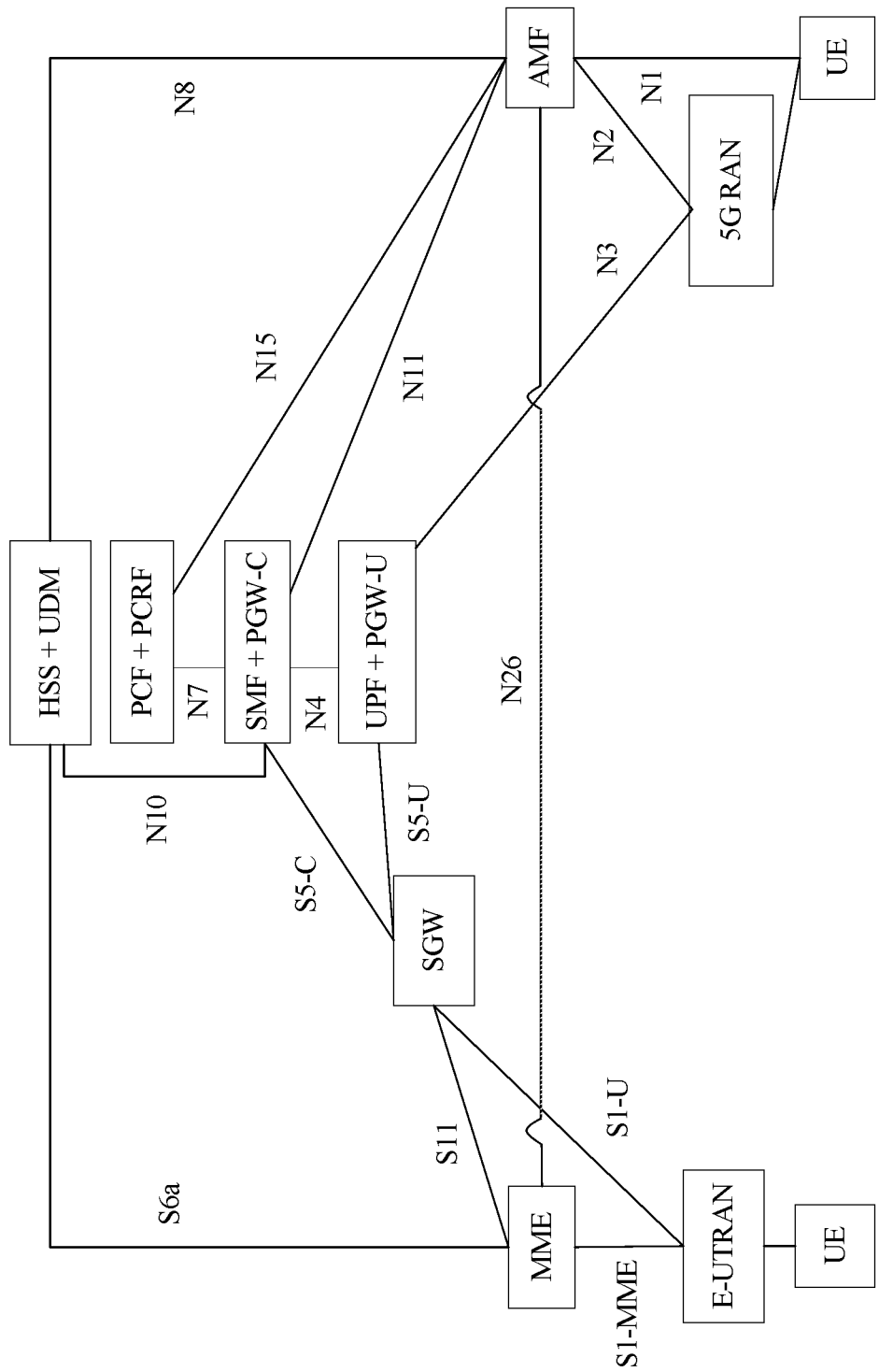
FIG. 1 is an architectural diagram of interworking between a 5G network and a 4G network.

Referring to FIG. 1, FIG. 1 is an architecture of a non-roaming scenario of interworking between a 5G network and an evolved packet core (EPC)/an evolved universal terrestrial radio access network (E-UTRAN), and is a specific application scenario of the embodiments of this application.

Functions of network elements in the interworking architecture shown in FIG. 1 are described below.

The 5G radio access network (RAN) is a network that includes a plurality of 5G RAN nodes, and implements a radio physical layer function, resource scheduling and radio resource management, radio access control, and a mobility management function. The 5G RAN is connected to a user plane function (UPF) network element through a user plane interface N3, to transfer data of UE. The RAN establishes a control plane signaling connection to an access and mobility management function (AMF) network element of the core network through a control plane interface N2, to implement functions such as radio access bearer control. An AMF network element is mainly responsible for functions such as UE authentication, UE mobility management, network slice selection, and selection of a session management function network element. As an anchor for connecting N1 signaling and N2 signaling, the AMF network element also routes N1 and N2 session management (SM) messages to the SMF network element, and maintains and manages status information of UE.

An SMF network element is connected to the AMF network element through an interface N11, and is mainly responsible for all control plane functions in UE session management, including selection of a user plane function (UPF) network element, internet protocol (IP) address allocation, quality of service (QoS) attribute management of a session, and obtaining a policy and charging control (PCC) rule from a policy control function (PCF) network element.

A PCF network element is connected to the SMF network element through an interface N7, and connected to the AMF network element through an interface N15. The PCF network element is configured to generate and store a PCC rule related to session management and provide the PCC rule to the SMF network element, and is further configured to generate policy information related to mobility management and provide the policy information to the AMF network element.

A user data management (UDM) network element is connected to the AMF network element through an interface N8, and connected to the SMF network element through an interface N10. The user data management network element is configured to store subscription information related to a user, and provide subscription-related parameter information to the corresponding network elements separately through the interface N8 and the interface N10.

A UPF network element is connected to the SMF network element through an interface N4. The UPF network element serves as a session connection anchor of a protocol data unit (PDU), and is responsible for data packet filtering, data transmission or forwarding, rate control, and charging information generation that are for UE.

A serving gateway (SGW) is connected to the UPF network element through an interface S5-U, and connected to the SMF network element through an interface S5-U. The serving gateway is configured to route and forward a data packet under the control of a mobility management (MME) network element.

An MME network element is connected to the UDM network element through an interface S6a, connected to the SGW through an interface S11, and connected to the E-UTRAN through an interface S1-MME. The MME network element is mainly responsible for functions such as mobility management, bear management, user authentication, and selection of an SGW and a PGW. When single registration is performed in a 5G network and a 4G network, handover performed between the MME network element and the AMF network element is supported by using an interface N26. Certainly, handover between the MME network element and the AMF network element may also be supported by using another interface. This is not limited herein.

The E-UTRAN is connected to the SGW through an interface S1-U, and connected to the MME through the interface S1-MME. The interface S1-MME is a control plane protocol reference point between the E-UTRAN and the MME, and the interface S1-U is a user plane tunnel reference point of each bearer between the E-UTRAN and the SGW.

It should be understood that, all the network elements shown in FIG. 1 may be independent of each other, or two or more network elements may be integrated together. This is not specifically limited in this embodiment of this application.

A terminal device mentioned in this specification may be a wireless terminal device or may be a wired terminal device. The wireless terminal device may be a device that provides voice and/or other service data connectivity for a user, a handheld device with a wireless connection function, or another processing device connected to a wireless modem. The wireless terminal device may communicate with one or more core networks by using a radio access network (RAN). The wireless UE may be a mobile terminal such as a mobile phone (or referred to as a "cellular" phone) or a computer with a mobile terminal. For example, the wireless terminal device may be a portable, pocket-sized, handheld, computer built-in, or in-vehicle mobile apparatus, which exchange a voice and/or data with the radio access network. For example, the wireless terminal device may be a device such as a personal communications service (PCS)

phone, a cordless telephone set, a Session Initiation Protocol (SIP) phone, a wireless local loop (WLL) station, or a personal digital assistant (PDA). The wireless UE may also be referred to as a system, a subscriber unit, a subscriber station, a mobile station, a mobile station, a remote station, a remote terminal, an access terminal, a user terminal, a user agent, user equipment (User Device), or user equipment.

In the following description, that the terminal device is UE is used as an example for description. In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The 4G network and a current 5G network are used as an example for some English abbreviations in this specification to describe the embodiments of this application, and the English abbreviations may change with evolution of networks. For specific evolution, refer to the descriptions in a corresponding standard.

The architecture shown in FIG. 1 is used as an example below to describe a process, in the prior art, of handing over UE from a 5G network to a 4G network.

To ensure service continuity of the UE after system handover, performing system handover for the UE is substantially transferring, to the 4G network, parameters corresponding to a packet data unit (PDU) session of the UE in the 5G network, such as an evolved packet core bearer number (EPS bearer ID), a quality of service (QoS) parameter, and a traffic flow template (TFT), so that a corresponding EPS bearer can be quickly established in the 4G network based on the parameters, and a service is further provided for the UE by using the 4G network.

The parameters corresponding to the PDU session are briefly described below.

A PDU session includes the following parameters.

(a) The PDU session has only one default quality of service flow (default QoS flow). The default QoS flow is created during establishment of the PDU session. Main QoS parameters include a 5G quality of service identifier (5G QoS Identifier, 5QI), a quality of service flow ID (QoS Flow ID, QFI), and an allocation and retention priority (ARP). At least one service data flow (SDF) may be aggregated in one default QoS flow, and the SDFs have a common 5QI and ARP.

(b) The PDU session may include one or more non-guaranteed bit rate QoS flows (non-GBR QoS flow). The non-GBR QoS flow is created in a PDU session modification procedure initiated on a UE side or a network side. Main QoS parameters include a 5QI, a QFI, a maximum bit rate (MBR), an ARP, and an uplink/downlink IP filter (UL+DL IP filter). One non-GBR QoS flow has at least one SDF, and another one or more SDFs may also be aggregated in the non-GBR QoS flow. The SDFs have a common 5QI and ARP.

(c) The PDU session may include one or more guaranteed bit rate quality of service flows (GBR QoS flow). The GBR QoS flow is created in a PDU session modification procedure initiated on a UE side or a network side. Main QoS parameters include a 5QI, a QFI, a GBR, an MBR, an ARP, a UL+DL IP filter, and a TFT. One GBR QoS flow has at least one SDF, and another one or more SDFs may also be aggregated in the non-GBR QoS flow.

In the prior art, before the UE is handed over from the 5G network to the 4G network, a 5G network side prepares the default QoS flow and the GBR QoS flow. That is, when the UE is handed over to the 4G network, corresponding session management (SM) contexts of a default evolved packet core bearer (Default EPS Bearer) and a guaranteed bit rate evolved packet core bearer (GBR EPS bearer) are prepared. The SM context includes an evolved packet core bearer number (EPS bearer ID) and a QoS parameter including a TFT.

In a process of handover from the 5G network to the 4G network, an access and mobility management function (AMF) network element selects a part of the prepared GBR QoS flow based on a data network name (DNN), a quality of service profile (QoS profile), or an operator policy, and switches the part of the GBR QoS flow to the 4G network, to complete handover.

Before the UE is handed over from the 5G network to the 4G network, an SM context that is corresponding to each GBR QoS flow and that is in the 4G network needs to be maintained in the 5G network. For example, when a QoS parameter is updated, or in a process of handing over the UE between a plurality of 5G networks, or when an SMF is relocated, the 5G network modifies the corresponding SM context that is of the GBR QoS flow and that is in 4G network.

However, a maximum quantity of EPS bearer IDs of one UE is 8 in the 4G network, and a quantity of default QoS flows and GBR QoS flows of one UE in the 5G network may exceed 8. In addition, a corresponding EPS bearer ID in the 4G network is allocated to each default QoS flow and each GBR QoS flow in the 5G network. Therefore, a quantity of EPS bearer IDs in the 4G network that are allocated to each UE in the 5G network may exceed 8, and some GBR services in the 5G network may be unable to be performed in the 4G network, for example some real-time communication services such as automatic driving and a tactile network. Therefore, in the process of handing over the UE from the 5G network to the 4G network, some specific GBR QoS flows in all GBR QoS flows corresponding to the UE need to be selected and do not need to be switched to the 4G network, for example, a GBR QoS flow corresponding to a service that cannot be performed in the 4G network or a GBR QoS flow corresponding to a non-important service. Correspondingly, SM contexts corresponding to the selected GBR QoS flows do not need to be sent to the 4G network.

In a first aspect, before handover is performed, the SM contexts corresponding to the unselected GBR QoS flows are also maintained in the 5G network, but the maintained SM contexts are finally not used in the 4G network. This is equivalent to waste of resources used to maintain the SM contexts in the 5G network. Therefore, a technical problem of resource waste exists in the handover method in the prior art.

In view of this, the embodiments of this application provide a session management method. In the method, when establishing a guaranteed bit rate GBR flow of UE, a session management network element first needs to judge the GBR flow, to determine whether the GBR flow is a GBR flow required for handing over the UE from a first communications system to a second communications system. If determining that the GBR flow is the GBR flow required for handing over the UE from the first communications system to the second communications system, the session management network element establishes, for the GBR flow, a session context corresponding to the second communications system. In this way, when establishing a GBR flow, the session management network element needs to establish, for only a GBR flow that needs to be switched to the second communications system, a session context corresponding to the second communications system, and does not establish, for a GBR flow that does not need to be handed over to the second communications system, a session context corresponding to the second communications system. Correspondingly, the session management network element does not need to maintain the session context that is corresponding to the second communications system and that is of the GBR flow that does not need to be handed over to the second communications system, so as to reduce resource consumption.

Figure 2:
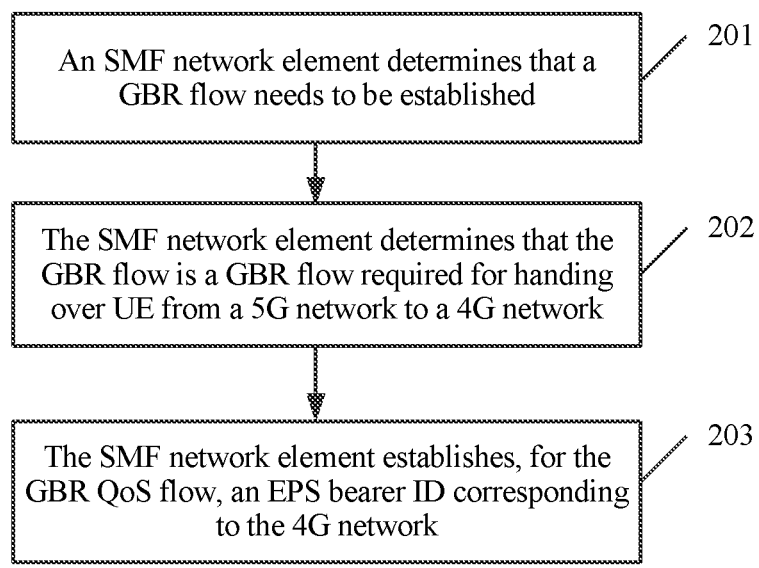
FIG. 2 is a flowchart of a session management method according to an embodiment of this application.

The method provided in the embodiments of this application is described below with reference to the accompanying drawings. Referring to FIG. 2, FIG. 2 is a flowchart of a session management method according to an embodiment of this application. The method may be applied to the interworking architecture of different systems shown in FIG. 1.

It should be noted that network elements in this embodiment of this application may be corresponding network elements in FIG. 1. Certainly, if the method is applied to a different interworking architecture, a session management network element may also be another network element. This is not limited herein. For example, when the method is applied to the architecture shown in FIG. 1, the session management network element may be the SMF network element in FIG. 1, a policy control network element may be the PCF network element in FIG. 1, and an access management network element may be the AMF network element in FIG. 1, and so on. In the following description, an example in which the network elements in the method are the corresponding network elements in FIG. 1 is used. The method may include the following steps.

Step 201: An SMF network element determines that a GBR flow needs to be established.

In this embodiment of this application, the GBR flow may be a GBR QoS flow, or may be another GBR flow. In this embodiment of this application, an example in which the GBR flow is a GBR QoS flow is used for description.

It should be noted that a GBR QoS flow is established in a PDU session modification procedure. Therefore, that the SMF network element determines whether a GBR QoS flow needs to be established is determining whether the PDU session modification procedure needs to be started.

The SMF network element may be triggered to start the PDU session modification procedure in any one of the following several manners:

In a first possible implementation, UE initiates the PDU session modification procedure. The UE sends a non-access stratum (NAS) message to an AMF network element. The NAS message includes a PDU session ID and an N1 SM message that carries a PDU session modification request. Then the AMF network element triggers an Nsmf_PDUSession_UpdateSMContext service operation based on the NAS message, to send, to the SMF network element, the PDU session ID and the N1 SM message that carries the PDU session modification request. After receiving the message sent from the AMF network element, the SMF network element starts the PDU session modification procedure, and determines that a GBR QoS flow needs to be established.

It should be noted that if the UE is in a CN-idle state, that is, no air interface resource is established between the UE and a RAN, the NAS message needs to be sent to the AMF network element by using a 5G RAN by using a service request procedure. Mover, in addition to including the PDU session ID and the N1 SM message that carries the PDU session modification request, the NAS message carries location information of the UE, for example, a RAN ID and a cell ID. Then the AMF network element sends the NAS message to the SMF network element.

In a second possible implementation, a PCF network element initiates the PDU session modification procedure based on operator policy information and a request that is from an application function (AF) network element. The PCF network element sends a PCC rule of a GBR QoS flow to the SMF network element by using an Npcf SMPolicyControl_UpdateNotify service. After receiving the PCC rule, the SMF network element starts the PDU session modification procedure, and determines that a GBR QoS flow needs to be established. In this embodiment of this application, the PCC rule includes a GBR parameter, a multiple frequency band indicator (MBR) parameter, and an IP filter, or the PCC rule may be a delay requirement.

In a third possible implementation, when updating subscription data of UE, a UDM network element sends a subscriber permanent identity and subscriber data to the SMF network element by using a Nudm_SubscriberData_UpdateNotification service operation. After receiving the subscriber information, the SMF network element triggers the PDU session modification procedure, determines that a GBR QoS flow needs to be established, updates the subscription data of the UE, and responds to the UDM network element by adding the subscriber permanent identity of the UE to an acknowledgement message.

In a fourth possible implementation, the SMF network element may determine, based on a locally configured policy, to modify a PDU session. Therefore, the SMF network element starts the PDU session modification procedure, and determines that a GBR QoS flow needs to be established. For example, the SMF network element may periodically update a QoS parameter of UE, or a UPF network element controlled by the SMF network element changes, for example, a new UPF network element supports a different slice type or a different session continuity (SSC) mode. In this case, the SMF network element determines that a GBR QoS flow needs to be established.

In a fifth possible implementation, if notification control for a GBR QoS flow is configured in a 5G RAN, and the 5G RAN determines that a QoS parameter of the GBR QoS flow cannot be met in the 5G RAN, the 5G RAN sends an N2 message to an AMF network element. The N2 message includes a PDU session ID and N2 SM information. The N2 SM information includes a QFI, location information of UE, and a notification message, so as to notify, by using the notification message, the AMF network element that the QoS parameter of the GBR QoS flow cannot be met in the 5G RAN. In this case, the AMF network element triggers an Nsmf_PDUSession_UpdateSMContext service operation, to send the N2 SM message to the SMF network element. After receiving the message sent from the AMF network element, the SMF network element starts the PDU session modification procedure, and determines that a GBR QoS flow needs to be established.

Step 202: The SMF network element determines that the GBR flow is a GBR flow required for handing over UE from a 5G network to a 4G network.

After the SMF network element starts the PDU session modification procedure, the SMF network element needs to determine the GBR QoS flow corresponding to the PDU session modification procedure, to determine whether the GBR QoS flow is a GBR QoS flow required for handing over the UE from the 5G network to the 4G network.

Specifically, the SMF network element may determine, based on at least one of a PCC rule, an operator policy, and a DNN, that the GBR QoS flow is the GBR QoS flow required for handing over the UE from 5G to 4G.

In a possible implementation, when determining, based on a PCC rule, whether the GBR QoS flow is the GBR QoS flow required for handing over the UE from 5G to 4G, the SMF network element may perform determining by determining whether a PCC rule corresponding to the GBR QoS flow includes a 4G PCC rule. If the PCC rule corresponding to the GBR QoS flow includes the 4G PCC rule, the GBR QoS flow is the GBR QoS flow required for handing over the UE from 5G to 4G. If the PCC rule corresponding to the GBR QoS flow does not include the 4G PCC rule, the GBR QoS flow is not the GBR QoS flow required for handing over the UE from 5G to 4G.

In a possible implementation, when the SMF network element determines that the PCC rule corresponding to the GBR QoS flow includes a delay requirement, if the SMF network element determines that the delay requirement in the PCC rule is relatively high, the SMF network element determines that the GBR QoS flow is not the GBR QoS flow required for handing over the UE from 5G to 4G. If the SMF network element determines that the delay requirement in the PCC rule is relatively low, the SMF network element determines that the GBR QoS flow is the GBR QoS flow required for handing over the UE from 5G to 4G.

In a possible implementation, when determining, based on an operator policy, whether the GBR QoS flow is the GBR QoS flow required for handing over the UE from 5G to 4G, the SMF network element may determine whether a service type corresponding to the GBR QoS flow is a service type supported by an operator policy of the network. For example, an operator policy of the 4G network supports a service type of video data downloading, and does not support a real-time communication service type such as automatic driving, an AR/VR application, or a tactile network. If the service type corresponding to the GBR QoS flow is automatic driving, the SMF network element determines that the GBR QoS flow is not the GBR QoS flow required for handing over the UE from 5G to 4G. If the service type corresponding to the GBR QoS flow is video data downloading, the SMF network element determines that the GBR QoS flow is the GBR QoS flow required for handing over the UE from 5G to 4G.

In a possible implementation, when the SMF network element determines, based on a DNN, whether the GBR QoS flow is the GBR QoS flow required for handing over the UE from 5G to 4G, the SMF network element may pre-store a correspondence between each DNN and whether a GBR QoS flow corresponding to the DNN needs to be handed over to the 4G network. For example, an Internet of Vehicles needs to be handed over to the 4G network, but machine-to-machine (M2M) or an Internet of Things (IoT) does not need to be handed over to the 4G network. In this way, after determining a DNN corresponding to the GBR QoS flow, the SMF network element determines, based on the correspondence between the DNN and whether the GBR QoS flow corresponding to the DNN needs to be handed over to the 4G network, whether the GBR QoS flow is the GBR QoS flow required for handing over the UE from 5G to 4G. For example, the correspondence pre-stored by the SMF network element is that the Internet of Vehicles needs to be handed over to the 4G network, but machine-to-machine (M2M) or the Internet of Things (IoT) does not need to be handed over to the 4G network. If the DNN corresponding to the GBR QoS flow is the Internet of Vehicles, the SMF network element determines that the GBR QoS flow is the GBR QoS flow required for handing over the UE from 5G to 4G. If the DNN corresponding to the GBR QoS flow is the Internet of Things, the SMF network element determines that the GBR QoS flow is not the GBR QoS flow required for handing over the UE from 5G to 4G.

Certainly, it may be determined, by combining any two or three of the foregoing plurality of manners, whether the GBR QoS flow is the GBR QoS flow required for handing over the UE from 5G to 4G. This is not limited in this embodiment of this application.

It should be noted that each of the foregoing plurality of determining manners may also be corresponding to a plurality of specific implementations, and the plurality of specific implementations are not enumerated one by one in this embodiment of this application.

An example in which the SMF network element performs determining based on a PCC rule is used below for specific description.

In a specific implementation process, the SMF network element may perform determining in the following manner.

The SMF network element performs determining based on a PCC rule obtained from the PCF network element.

In this embodiment of this application, because manners of triggering the SMF network element to start the PDU session modification procedure are different, methods for obtaining the PCC rule from the PCF network element by the SMF network element are also different.

Obtaining Method 1:

If the SMF network element is triggered to start the PDU session modification procedure by using the first or the fifth possible implementation, the N1 SM message or the N2 SM message received by the SMF network element carries a QoS parameter of a GBR QoS flow that needs to be established for the UE. When the SMF network element determines that a dynamic PCC rule is deployed in the PCF network element, the SMF network element sends the obtained QoS parameter to the PCF network element. Then, if the PCF network element determines that the received QoS parameter includes GBR information used to establish a GBR QoS flow, the PCF network element determines, based on at least one piece of information in a DNN and operator policy information, the QoS parameter, indication information indicating interworking between a first communications standard network and a second communications standard network, and the like, whether the to-be-established GBR QoS flow needs to be handed over to the 4G network. The determining process is the same as the foregoing process in which the SMF network element determines whether the GBR QoS flow is the GBR QoS flow required for handing over the UE from the 5G network to the 4G network. Details are not described herein again. The indication information indicating interworking between the first communications standard network and the second communications standard network includes registration capability information indicating that the UE, the SMF network element, and the AMF network element supports single registration, and/or the UE supports a non-access stratum NAS mode applicable to the first communications standard network and a NAS mode applicable to the second communications standard network.

If the PCF network element determines that the GBR QoS flow needs to be handed over to the 4G network, the PCF network element allocates a corresponding 5G PCC rule and a corresponding 4G PCC rule to the GBR QoS flow, including a 5G QoS parameter and a 4G QoS parameter. The QoS parameter includes information such as a QCI, a GBR, an MBR, an ARP, precedence, and an uplink/downlink TFT. Alternatively, if the PCF network element determines that the GBR QoS flow does not need to be handed over to the 4G network, the PCF network element allocates only a corresponding 5G PCC rule to the GBR QoS flow, and does not allocate a corresponding 4G PCC rule to the GBR QoS flow. Then the PCF network element sends a generated PCC rule to the SMF network element, so that the SMF network element obtains, from the PCF network element, the PCC rule corresponding to the GBR QoS flow. The PCC rule includes the 5G PCC rule, or the PCC rule includes the 5G PCC rule and the 4G PCC rule.

Obtaining Method 2:

If the SMF network element is triggered to start the PDU session modification procedure by using the second possible implementation, the PCF network element receives service information of the UE sent from the AF network element. The service information includes IP filtering information, media information (bandwidth, jitter, a delay, and the like), and the like. Then the PCF network element generates a 5G PCC rule based on the service information. The 5G PCC rule includes a 5G QoS parameter, such as a QCI, a GBR, an MBR, an ARP, and uplink/downlink data packet filtering information. If the PCF determines that the generated 5G QoS parameter includes GBR information used to establish a GBR QoS flow, the PCF network element determines, based on at least one piece of information in a DNN and operator policy information, the QoS parameter, indication information indicating interworking between a first communications standard network and a second communications standard network, and the like, whether the to-be-established GBR QoS flow needs to be handed over to the 4G network. The indication information indicating interworking between the first communications standard network and the second communications standard network includes registration capability information indicating that the UE, the SMF network element, and the AMF network element supports single registration, and/or the UE supports a non-access stratum NAS mode applicable to the first communications standard network and a NAS mode applicable to the second communications standard network. If the PCF network element determines that the GBR QoS flow needs to be handed over to the 4G network, the PCF network element allocates a corresponding 4G PCC rule to the GBR QoS flow, including a 4G QoS parameter. The 4G QoS parameter includes information such as a QCI, a GBR, an MBR, an ARP, precedence, and an uplink/downlink TFT.

Alternatively, if the PCF network element determines that the GBR QoS flow does not need to be handed over to the 4G network, the PCF network element does not allocate a corresponding 4G PCC rule to the GBR QoS flow. Then the PCF network element sends a generated PCC rule to the SMF network element by using the Npcf SMPolicyControl_UpdateNotify service, so that the SMF network element obtains, from the PCF network element, the PCC rule corresponding to the GBR QoS flow. The PCC rule includes the 5G PCC rule, or the PCC rule includes the 5G PCC rule and the 4G PCC rule.

After obtaining, from the PCF network element, the PCC rule corresponding to the GBR QoS flow, the SMF network element determines whether the PCC rule includes the 4G PCC rule. If the PCC rule includes the 4G PCC rule, the SMF network element determines that the GBR QoS flow is the GBR QoS flow required for handing over the UE from the 5G network to the 4G network.

An example in which the SMF network element performs determining based on an operator policy or a DNN is used below for specific description.

If the SMF network element is triggered to start the PDU session modification procedure by using the first or the fifth possible implementation, the N1 SM message or the N2 SM message received by the SMF network element carries service information of the UE. The service information includes IP filtering information, media information (bandwidth, jitter, a delay, and the like), and the like. After the SMF network element determines that a static PCC rule is locally deployed, the SMF network element generates a 5G PCC rule based on the service information. The 5G PCC rule includes a 5G QoS parameter, such as a QCI, a GBR, an MBR, an ARP, and an uplink/downlink TFT. If the SMF network element finds that the generated 5G QoS parameter includes GBR information used to establish a GBR QoS flow, the SMF network element determines, based on at least one piece of information in a DNN and operator policy information, the QoS parameter, indication information indicating interworking between a first communications standard network and a second communications standard network, and the like, whether the to-be-established GBR QoS flow needs to be handed over to the 4G network. The indication information indicating interworking between the first communications standard network and the second communications standard network includes registration capability information indicating that the UE, the SMF network element, and the AMF network element supports single registration, and/or the UE supports a non-access stratum NAS mode applicable to the first communications standard network and a NAS mode applicable to the second communications standard network.

After the SMF network element determines the to-be-established GBR QoS flow, the SMF may further map a PCC rule to the GBR QoS flow. For example, when the SMF network element determines that the GBR QoS flow needs to be handed over to the 4G network, the SMF network element maps a corresponding 4G PCC rule to the GBR QoS flow, including a 4G QoS parameter. The QoS parameter includes information such as a QCI, a GBR, an MBR, an ARP, precedence, and an uplink/downlink TFT. Alternatively, if the SMF network element determines that the GBR QoS flow does not need to be handed over to the 4G network, the SMF network element does not map a corresponding 4G PCC rule to the GBR QoS flow.

It should be noted that when the SMF network element is triggered to start the PDU session modification procedure by using the third and the fourth implementations, the SMF network element may use any one of the foregoing plurality of manners to determine whether the GBR QoS flow is the GBR QoS flow required for handing over the UE from the 5G network to the 4G network. Details are not described herein again.

After the SMF network element completes the foregoing steps, the SMF network element allocates a corresponding 4G QoS parameter to the GBR QoS flow that needs to be handed over to the 4G network.

Step 203: The SMF network element establishes, for the GBR QoS flow, an EPS bearer ID corresponding to the 4G network.

After the SMF network element allocates the corresponding 4G QoS parameter to the GBR QoS flow that needs to be handed over to the 4G network, the SMF network element further needs to establish, for the GBR QoS flow, the EPS bearer ID corresponding to the 4G network.

In this embodiment of this application, two establishment manners are mainly included.

Establishment Manner 1:

If the EPS bearer ID is allocated by the AMF network element, the SMF network element needs to send, to the AMF network element, related information used to establish the EPS bearer ID that is corresponding to the GBR QoS flow and that is in the 4G network. Because objects that trigger the SMF network element to start the PDU session modification procedure are different, service operations used by the SMF network element to send the related information to the AMF network element are also different. There are specifically the following two manners:

(a) For a case in which the UE triggers the SMF network element to start the PDU session modification procedure, the SMF network element triggers the Nsmf_PDUSession_UpdateSMContext service operation with the AMF network element. An Nsmf_PDUSession_UpdateSMContext message sent from the SMF network element to the AMF network element includes at least the N2 SM message and the N1 SM message. The N2 SM message includes the PDU session ID, a quality of service profile (QoS Profile), and a session-aggregated maximum bit rate (Session-AMBR) parameter. The N1 SM message includes a session modification command. The session modification command includes the PDU session ID, a quality of service rule (QoS rule), and the session-AMBR parameter. The QoS rule includes partial content of the PCC rule. For example, the QoS rule may include information such as an uplink packet filter, in the PCC rule, that is related to uplink data.

(b) For a case other than the case in which the UE triggers the SMF network element to start the PDU session modification procedure, the SMF network element triggers a Namf_Communication_N1N2MessageTransfer service operation of AMF network element. A Namf_Communication_N1N2MessageTransfer message sent from the SMF network element to the AMF network element includes at least the N2 SM message and the N1 SM message. Content included in the N2 SM message and the N1 SM message is the same as that in (a). Details are not described herein again.

After the AMF network element receives the foregoing information sent from the SMF network element, the AMF network element allocates, to the GBR QoS flow, the EPS bearer ID in the 4G network based on the foregoing information.

Establishment Manner 2:

If the EPS bearer ID is allocated by the UE, the SMF network element needs to send, to the UE, related information used to establish the EPS bearer ID that is corresponding to the GBR QoS flow and that is in the 4G network. Specifically, the SMF network element first sends the related information to the AMF network element, and then the AMF network element forwards the related information to the UE. After receiving the related information, the UE allocates the EPS bearer ID to the GBR QoS flow.

Correspondingly, because objects that trigger the SMF network element to start the PDU session modification procedure are different, service operations used by the SMF network element to send the related information to the AMF network element are also different. For details, refer to (a) or (b) in the establishment manner 1. Details are not described herein again.

After the AMF network element receives the information sent from the SMF network element, the AMF network element sends, to the RAN, information carried in the N2 SM message, and sends the N1 SM message to the UE. After receiving the N1 SM message, the UE allocates the EPS bearer ID to the GBR QoS flow based on a 4G QoS parameter in the N1 SM message.

After allocating the EPS bearer ID to the GBR QoS flow, the AMF network element or the UE may send acknowledgement information to the SMF network element, to notify the SMF network element that allocation of the EPS bearer ID is completed. In this case, the SMF network element completes a process of allocating an SM context to the GBR QoS flow required for handing over the UE from the 5G network to the 4G network.

It should be noted that the AMF network element may automatically allocate the EPS bearer ID to the GBR QoS flow corresponding to the PDU session modification procedure. That is, regardless of whether the GBR QoS flow needs to be handed over to the 4G network, the AMF network element allocates the EPS bearer ID to the GBR QoS flow. For example, before the SMF network element determines whether the GBR QoS flow needs to be handed over to the 4G network, the AMF network element has allocated the EPS bearer ID to the GBR QoS flow and has notified the SMF network element of the EPS bearer ID. If the SMF network element determines that the GBR QoS flow does not need to be handed over to the 4G network, the SMF network element deletes the EPS bearer ID, and sends notification information to the AMF network element, to instruct the AMF to release the corresponding EPS bearer ID. If the SMF network element determines that the GBR QoS flow needs to be handed over to the 4G network, the SMF network element directly reserves the EPS bearer ID, and does not need to perform step 203.

It should be noted that a process of establishing the GBR QoS flow is actually a process of starting the PDU session modification procedure. After the SMF network element completes the process of allocating the SM context to the GBR QoS flow, the SMF network element further needs to complete subsequent steps of the PDU session modification procedure. The subsequent steps are the same as corresponding steps in the PDU session modification procedure in the prior art. To save space of the specification, the subsequent steps of the PDU session modification procedure are briefly described below.

In a process in which the SMF network element establishes the EPS bearer ID for the GBR QoS flow, after the AMF network element receives the N2 SM message and the N1 SM message sent from the SMF network element, the AMF network element may send, to the 5G RAN, an N2 PDU session request carrying the N2 SM message, the PDU session ID, and the N1 SM message. The N1 SM message carries a PDU session modification command. After receiving the foregoing information, the 5G RAN may initiate specific AN signaling between the 5G RAN and the UE. The RAN sends some UE-related information from the SMF network element to the UE, to modify a RAN resource, in the UE, necessary for the PDU session. After completes modification, the UE sends acknowledgement information to the 5G RAN. For example, the UE sends a NAS message by using NAS SM signaling, to respond to the PDU session modification command. The NAS message includes the PDU session ID and the N1 SM message that carries a PDU session modification command ACK.

After receiving the acknowledgement information from the UE, the 5G RAN sends an N2 PDU session ACK message to the AMF, to respond to the N2 PDU session request message. Then the AMF network element forwards the acknowledgement message from the RAN to the SMF by using the Nsmf_PDUSession_UpdateSMContext service operation, to complete the PDU session modification procedure.

It should be noted that after the AMF network element receives the N2 SM message and the N1 SM message sent from the SMF network element, the AMF network element determines that the UE is in a connection management idle (CM-IDLE) state. In this case, the AMF triggers asynchronous type interaction, and reserves an SM request corresponding to the PDU session. Then the AMF network element initiates interaction between the AMF network element and the UE, and interaction between the AMF network element and the 5G RAN. For example, after the UE enters a connection management connected (CM-CONNECTED) state, the AMF network element brings the SM request message to the UE and the 5G RAN.

In addition, it should be noted that the SMF network element may need to update an N4 session. In this case, the SMF network element sends an N4 session modification request message to the UPF network element. The message carries an N4 session ID. Usually, the SMF network element may further send some updated QoS parameters or deployment update information such as UL update to the UPF network element by using this step. If the SMF network element obtains the PCC rule from the PCF network element, the SMF network element further needs to send a notification message, to notify the PCF network element whether the corresponding PCC rule is executed. A specific format of the notification message is not limited herein.

Figure 3A:
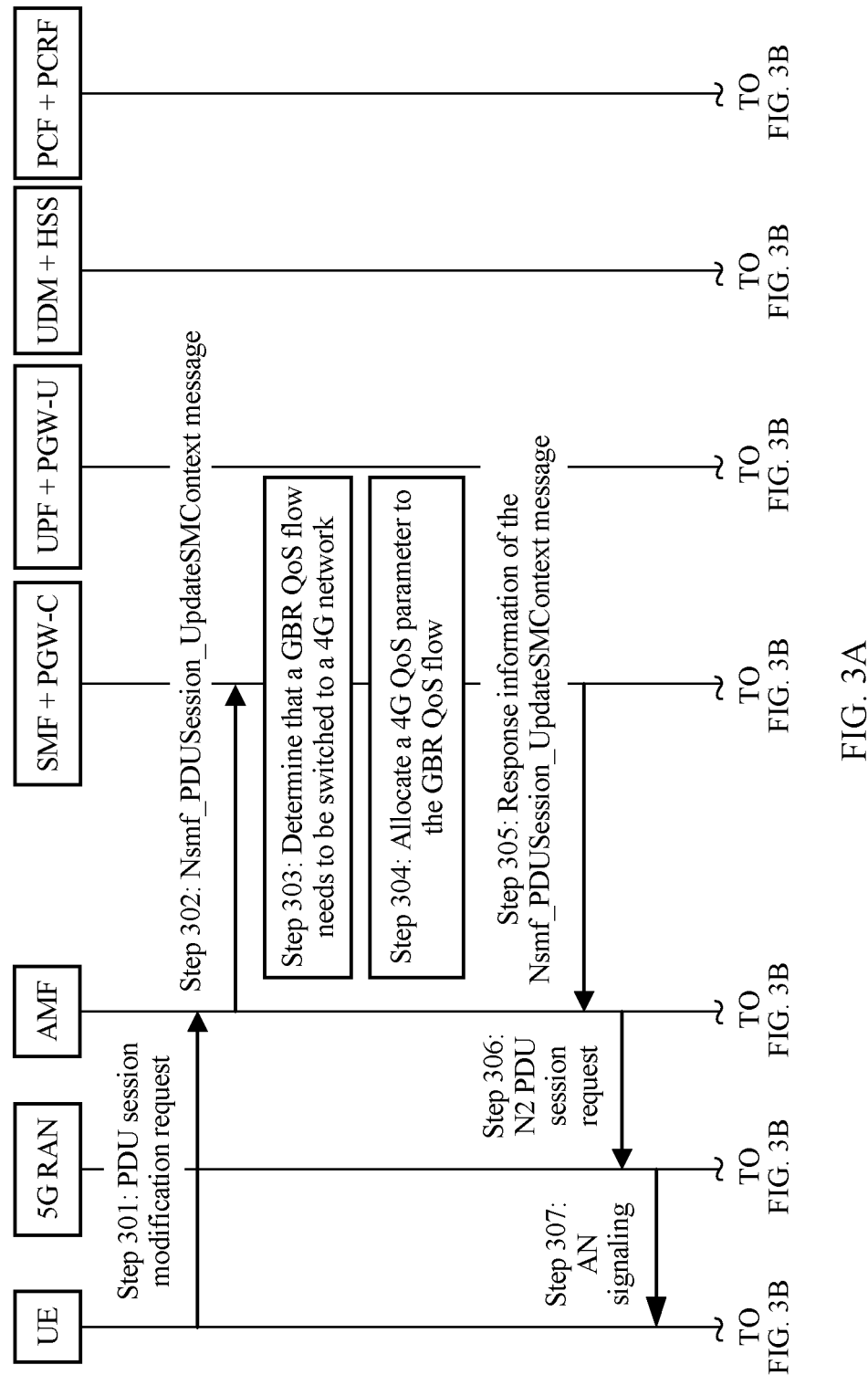
FIG. 3A and FIG. 3B are a flowchart of an instance of a session management method according to an embodiment of this application.
Figure 3B:
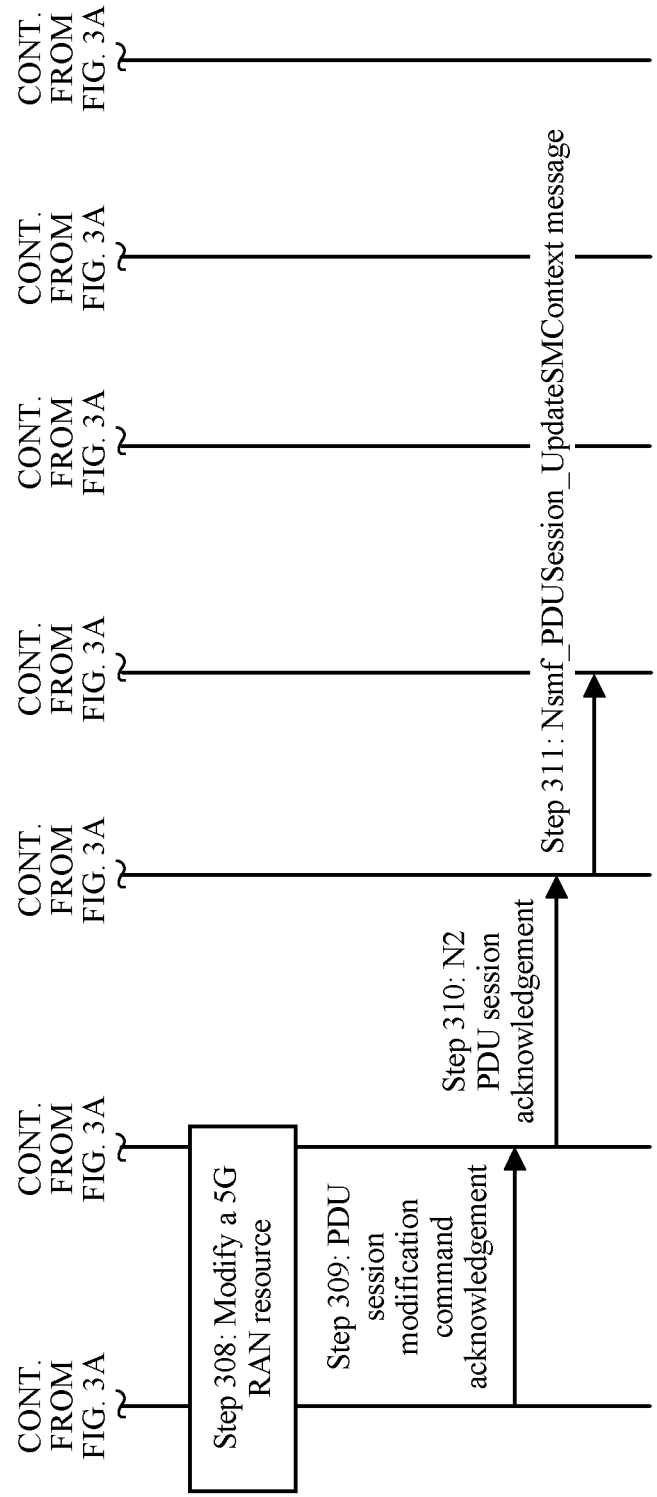

A specific implementation of the session management method in this embodiment of this application is described below by using a specific instance. Referring to FIG. 3A and FIG. 3B, FIG. 3A and FIG. 3B are a flowchart of an instance of a session management method according to an embodiment of this application. In the specific implementation, a PDU session modification procedure is triggered by UE, and an SMF network element determines, by using a locally deployed static PCC rule, whether a GBR QoS flow corresponding to the PDU session modification procedure is a GBR QoS flow required for handing over the UE from a 5G network to a 4G network, and an AMF network element allocates an EPS bearer ID, in the 4G network, to a GBR QoS flow that needs to be handed over to the 4G network. As shown in FIG. 3A and FIG. 3B, the method includes the following steps.

Step 301: UE sends a NAS message to an AMF network element.

In a possible implementation, the NAS message includes a PDU session ID and an N1 SM message that carries a PDU session modification request. The N1 SM message carries service information of the UE, and the service information includes IP filtering information, media information (bandwidth, jitter, a delay, and the like), and the like. Certainly, the NAS message may also include other information. This is not limited herein.

Step 302: The AMF network element triggers an Nsmf_PDUSession_UpdateSMContext service operation with an SMF network element.

In a possible implementation, the AMF network element forwards the N1 SM message and the PDU session ID in the NAS message to the SMF network element by using the Nsmf_PDUSession_UpdateSMContext service operation.

Step 303: The SMF network element starts a PDU session modification procedure, and determines that a GBR QoS flow corresponding to the PDU session modification procedure is a GBR QoS flow required for handing over the UE from a 5G network to a 4G network.

In a possible implementation, because a static PCC rule is locally deployed in the SMF network element, the SMF network element generates a 5G PCC rule based on the service information in the N1 SM message. The 5G PCC rule includes a 5G QoS parameter, such as a QCI, a GBR, an MBR, an ARP, and an uplink/downlink TFT. The SMF network element finds that the locally generated 5G QoS parameter includes GBR information used to establish a GBR QoS flow. For example, the 5G QoS parameter includes three pieces of GBR information, or may certainly include only one piece of GBR information. This is not limited herein. In the following description, an example in which the 5G QoS parameter includes three pieces of GBR information is used for description.

Then the SMF network element determines, based on at least one piece of information in a DNN and operation policy information, the QoS parameter, indication information indicating interworking between a first communications standard network and a second communications standard network, and the like, whether a to-be-established GBR QoS flow needs to be handed over to the 4G network. Specifically, the SMF network element may determine, based on the DNN, the QoS parameter, and the indication information indicating interworking between the first communications standard network and the second communications standard network, the GBR QoS flow that needs to be established; or may determine, based on the operator policy information, the QoS parameter, and the indication information indicating interworking between the first communications standard network and the second communications standard network, the GBR QoS flow that needs to be established; or the SMF network element determines, based on the DNN, the operator policy information, the QoS parameter, and the indication information indicating interworking between the first communications standard network and the second communications standard network, the GBR QoS flow that needs to be established. The SMF network element may pre-store any one of the three determining manners, or may simultaneously store the three manners. When determining is performed, another network element may instruct the SMF network element to use one of the three manners, or the SMF network element flexibly selects one manner from the three manners based on an actual situation. This is not limited herein.

The SMF network element determines, based on the operator policy information, the QoS parameter, and the indication information indicating interworking between the first communications standard network and the second communications standard network, three GBR QoS flows that need to be established, and determines that a first GBR QoS flow and a second GBR QoS flow are required for handing over the UE to the 4G network, and that a third GBR QoS flow is not required for handing over the UE to the 4G network.

It should be noted that when a plurality of GBR QoS flows need to be established in the PDU session modification procedure, the SMF network element needs to determine each GBR QoS flow, and a determining manner of each GBR QoS flow is described in the foregoing step. Certainly, the SMF network element may first classify the plurality of GBR QoS flows, and then select a GBR QoS flow from each class. A result of determining for the GBR QoS flow is a result of determining for each GBR QoS flow. Therefore, a determining speed may be accelerated, and power consumption of the SMF network element may be reduced.

Step 304: The SMF network element allocates a 4G QoS parameter to a GBR QoS flow that needs to be handed over to the 4G network.

When the SMF network element determines that the first GBR QoS flow and the second GBR QoS flow are required for handing over the UE to the 4G network, and that the third GBR QoS flow is not required for handing over the UE to the 4G network, the SMF network element separately maps corresponding 4G PCC rules to the first GBR QoS flow and the second GBR QoS flow. A PCC rule corresponding to each GBR QoS flow includes a 4G QoS parameter, and the QoS parameter includes information such as a QCI, a GBR, an MBR, an ARP, precedence, and an uplink/downlink TFT.

However, because the third GBR QoS flow does not need to be handed over to the 4G network, the SMF network element does not map a corresponding 4G QoS parameter to the third GBR QoS flow. That is, a QoS parameter corresponding to the third GBR QoS flow includes only a 5G QoS parameter.

Step 305: The SMF network element triggers the Nsmf_PDUSession_UpdateSMContext service operation with the AMF network element, to obtain an EPS bearer ID, in the 4G network, corresponding to the GBR QoS flow that needs to be handed over to the 4G network.

After the SMF separately maps the corresponding 4G PCC rules to the first GBR QoS flow and the second GBR QoS flow, the SMF network element sends an N2 SM message and the N1 SM message to the AMF network element by using the Nsmf_PDUSession_UpdateSMContext service operation. The N2 SM message includes the PDU session ID, QoS profiles respectively corresponding to the first GBR QoS flow and the second GBR QoS flow, and a session-AMBR parameter. The N1 SM message includes a session modification command. The session modification command includes the PDU session ID, QoS rules respectively corresponding to the first GBR QoS flow and the second GBR QoS flow, and the session-AMBR parameter.

The AMF network element determines that the N2 SM message includes a QoS profile corresponding to the first GBR QoS flow and a QoS profile corresponding to the second GBR QoS flow, and then the AMF network element separately allocates EPS bearer IDs, in the 4G network, to the first GBR QoS flow and the second GBR QoS flow. Because the N2 SM message does not include a QoS profile corresponding to the third GBR QoS flow, the AMF network element does not allocate an EPS bearer ID, in the 4G network, to the third GBR QoS flow. Certainly, the AMF network element may determine, by using other information in the Nsmf_PDUSession_UpdateSMContext service operation, whether to allocate an EPS bearer ID, in the 4G network, to a GBR QoS flow. For example, the Nsmf_PDUSession_UpdateSMContext service operation may carry indication information sent from the SMF network element. The indication information is used to notify the AMF network element of a GBR QoS flow that needs to be handed over to the 4G network. Alternatively, the AMF network element may determine, based on the QoS rule in the N1 SM message, whether to allocate the EPS bearer ID, in the 4G network, to the GBR QoS flow. Details are not described herein.

Step 306: The AMF network element sends an N2 PDU session request to a 5G RAN.

The AMF network element sends, to the 5G RAN in the N2 PDU session request, the N2 SM message, the PDU session ID, and the N1 SM message that carries the PDU session modification command that are sent from the SMF network element.

Step 307: The 5G RAN receives the N2 PDU session request, and sends AN signaling to the UE.

The 5G RAN sends, to the UE by using the AN signaling, the N1 SM message carrying the PDU session modification command.

Step 308: The UE receives the AN signaling, and modifies a 5G RAN resource in a PDU session corresponding to the N1 SM message.

Step 309: The UE sends a PDU session modification command ACK to the 5G RAN.

Step 310: The 5G RAN receives the PDU session modification command ACK, and sends an N2 PDU session ACK to the AMF network element.

After receiving the PDU session modification command ACK sent from the UE, the 5G RAN determines that the UE has completed content corresponding to the PDU session modification command, and then generates and sends the N2 PDU session ACK, to respond to the N2 PDU session request sent from the AMF network element.

Step 311: The AMF network element receives the N2 PDU session ACK, and forwards the acknowledgement message from the RAN to the SMF by using the Nsmf_PDUSession_UpdateSMContext service operation, to complete the PDU session modification procedure.

Figure 4A:
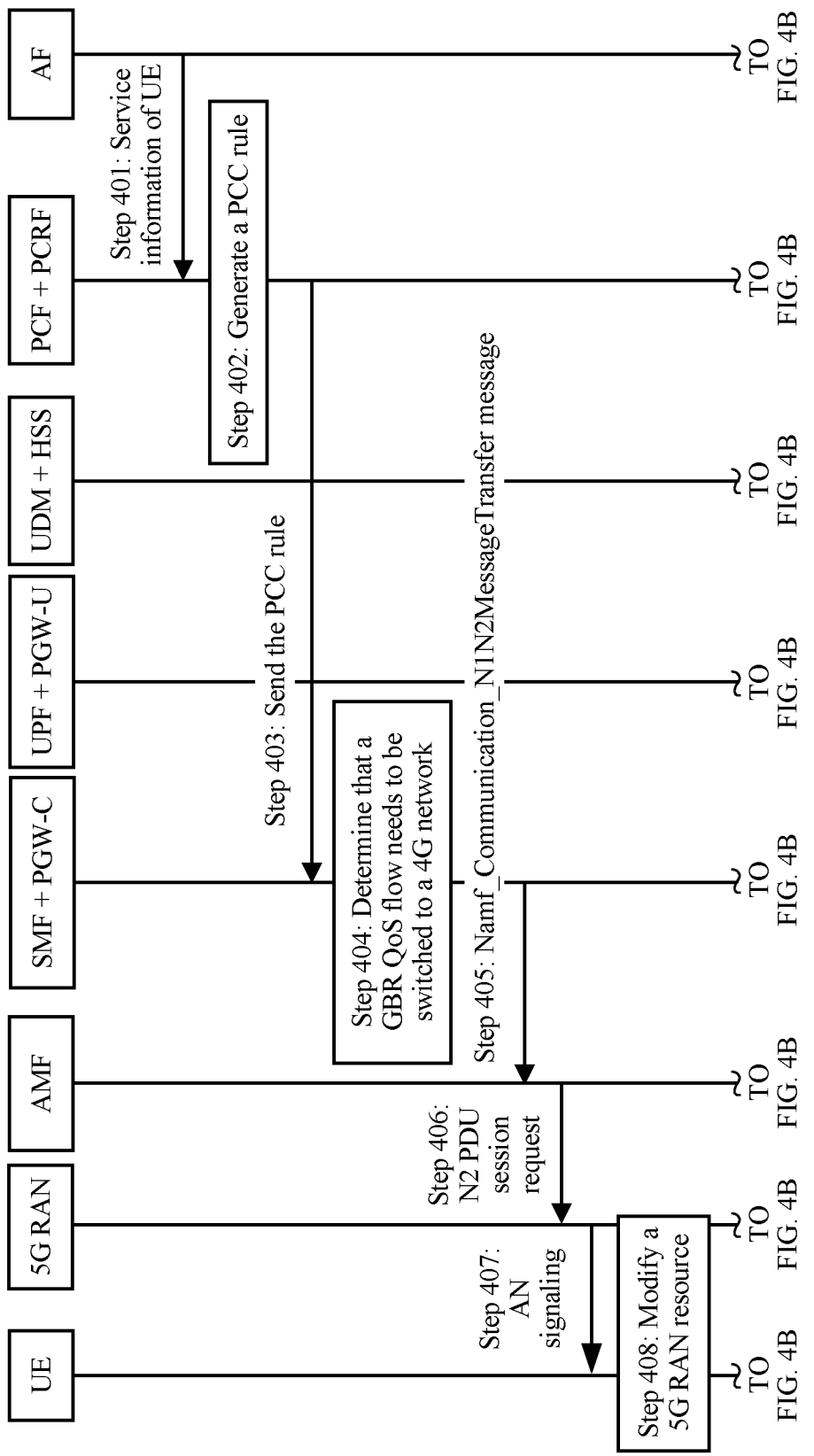
FIG. 4A and FIG. 4B are a flowchart of another instance of a session management method according to an embodiment of this application.
Figure 4B:
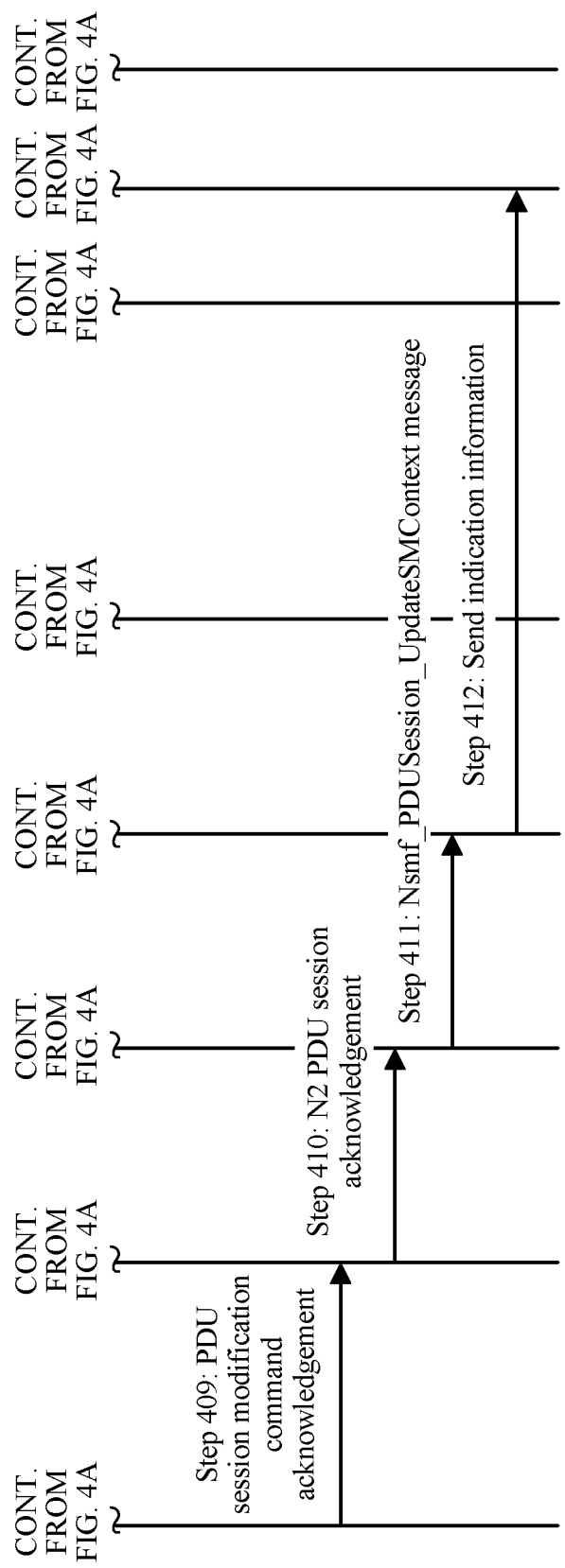

Next, referring to FIG. 4A and FIG. 4B, FIG. 4A and FIG. 4B are a flowchart of another instance of a session management method according to an embodiment of this application. In the specific implementation, a PDU session modification procedure is triggered by an AF, and an AMF network element allocates an EPS bearer ID, in a 4G network, to a GBR QoS flow that needs to be handed over to the 4G network. As shown in FIG. 4A and FIG. 4B, the method includes the following steps.

Step 401: An AF network element initiates a PDU session modification procedure, and sends service information of UE to a PCF network element.

In a possible implementation, the service information includes IP filtering information, media information (bandwidth, jitter, a delay, and the like), and the like.

Step 402: The PCF network element receives the service information, and generates a PCC rule based on the service information.

After receiving the service information, the PCF network element first generates, based on the service information, a 5G PCC rule corresponding to the PDU session modification procedure. The 5G PCC rule includes a 5G QoS parameter, such as a 5QI, a GBR, an MBR, an ARP, and uplink/downlink data packet filtering information.

If the PCF network element determines that the generated 5G QoS parameter includes the GBR information, the PCF network element determines, based on a DNN, the 5G QoS parameter, operator policy information, and the like, whether a GBR QoS flow corresponding to the GBR needs to be handed over to a 4G network. If the PCF network element determines that the GBR QoS flow needs to be handed over to the 4G network, the PCF network element allocates a corresponding 4G PCC rule to the GBR QoS flow. The 4G PCC rule includes a 4G QoS parameter, such as a QCI, a GBR, an MBR, an ARP, precedence, and an uplink/downlink data TFT. Alternatively, if the PCF network element determines that the GBR QoS flow does not need to be handed over to the 4G network, the PCF network element does not allocate a corresponding 4G PCC rule to the GBR QoS flow. That is, the PCC rule generated by the PCF network element based on the service information may include the 5G PCC rule and the 4G PCC rule, or may include only the 5G PCC rule.

Step 403: The PCF network element sends the generated PCC rule to an SMF network element.

In this embodiment of this application, the PCF network element may separately send the PCC rule. For example, after generating the 5G PCC rule, the PCF network element directly sends the 5G PCC rule to the SMF network element, so that the SMF network element allocates a QFI to the GBR QoS flow corresponding to the GBR, to establish the GBR QoS flow. Then after generating the 4G PCC rule corresponding to the GBR QoS flow, the PCF network element sends the 4G PCC rule to the SMF network element. The PCF network element may send the generated 5G PCC rule and 4G PCC rule to the SMF network element together after determining that the GBR QoS flow needs to be handed over to the 4G network. This is not limited herein.

Step 404: The SMF network element receives the PCC rule, and determines, based on the PCC rule, that the GBR QoS flow needs to be handed over to a 4G network.

After receiving the PCC rule, the SMF network element determines, based on whether the PCC rule includes the 4G PCC rule, whether the GBR QoS flow needs to be handed over to the 4G network. When determining that the PCC rule includes the 4G PCC rule, the SMF network element determines that the GBR QoS flow needs to be handed over to the 4G network. When determining that the PCC rule does not include the 4G PCC rule, the SMF network element determines that the GBR QoS flow does not need to be handed over to the 4G network.

In this embodiment of this application, an example in which the SMF network element determines that the GBR QoS flow needs to be handed over to the 4G network is used for description. In this case, the SMF network element obtains the 4G QoS parameter of the GBR QoS flow by using the PCC rule sent from the PCF network element.

Step 405: The SMF network element triggers a Namf_Communication_N1N2MessageTransfer service operation with the AMF network element, to obtain an EPS bearer ID that is corresponding to the GBR QoS flow and that is in the 4G network.

After obtaining the 4G QoS parameter of the GBR QoS flow, the SMF network element triggers the Namf_Communication_N1N2MessageTransfer service operation with the AMF network element, and sends an N2 SM message and an N1 SM message to the AMF network element. The N2 SM message includes a PDU session ID, a QoS profile corresponding to the GBR QoS flow, and a session-AMBR parameter. The N1 SM message includes a session modification command. The session modification command includes the PDU session ID, a QoS rule corresponding to the GBR QoS flow, and the session-AMBR parameter.

If the AMF network element determines that the N2 SM message includes the QoS profile corresponding to the GBR QoS flow, the AMF network element allocates the EPS bearer ID, in the 4G network, to the third GBR QoS flow. Certainly, the AMF network element may determine, by using other information in the Namf_Communication_N1N2MessageTransfer service operation, whether to allocate the EPS bearer ID, in the 4G network, to the GBR QoS flow. For example, the Namf_Communication_N1N2MessageTransfer service operation may carry indication information sent from the SMF network element. The indication information is used to notify the AMF network element of a GBR QoS flow that needs to be handed over to the 4G network. Alternatively, the AMF network element may determine, based on the QoS rule in the N1 SM message, whether to allocate the EPS bearer ID, in the 4G network, to the GBR QoS flow. Details are not described herein.

Step 406: The AMF network element sends an N2 PDU session request to a 5G RAN.

Step 407: The 5G RAN receives the N2 PDU session request, and sends AN signaling to the UE.

Step 408: The UE receives the AN signaling, and modifies a 5G RAN resource in a PDU session corresponding to the N1 SM.

Step 409: The UE sends a PDU session modification command ACK to the 5G RAN.

Step 410: The 5G RAN receives the PDU session modification command ACK, and sends an N2 PDU session ACK to the AMF network element.

Step 411: The AMF network element receives the N2 PDU session ACK, and forwards the acknowledgement message from the RAN to the SMF by using an Nsmf_PDUSession_UpdateSMContext service operation.

Step 406 to step 411 are the same as step 306 to step 311, and details are not described herein again.

Step 412: The SMF network element sends indication information to the PCF network element.

In this embodiment of this application, the PCC rule is generated by the PCF network element. Therefore, after executing the PCC rule, the SMF network element may send the indication information to the PCF network element, to notify the PCF network element that the corresponding PCC rule has been executed, so as to complete the PDU session modification procedure.

In the foregoing technical solutions, a policy control network element or a session management network element selects a GBR QoS flow in a GBR QoS flow establishment process, to ensure that an SM context corresponding to a second communications system is allocated to only a GBR QoS flow that needs to be handed over to the second communications system, and an SM context corresponding to the second communications system is not established for a GBR QoS flow that does not need to be handed over to the second communications system. Correspondingly, the session management network element does not need to maintain the SM context that is corresponding to the second communications system and that is of the GBR QoS flow that does not need to be handed over to the second communications system.

In a second aspect, in the prior art, when UE is handed over from a 5G network to a 4G network, an SMF network element selects some specific GBR QoS flows of the UE, so that the specific GBR QoS flows do not need to be handed over to the 4G network. In addition, handing over the UE from the 5G network to the 4G network is substantially selecting an important data radio bearer (DRB) from the 5G network, and handing over the selected data radio bearer to the 4G network. However, there are a plurality of types of DRBs, such as a default bearer, a GBR dedicated bearer, and a non-GBR bearer. It may be learned that the important DRB may not be able to be accurately selected from the 5G network by using a manner of selecting only a GBR QoS flow in the prior art. Consequently, an unnecessary packet data network (PDN) connection may be established in a handover process in the prior art, wasting signaling and channel resources.

In view of this, the embodiments of this application provide an interworking method between different systems. In the method, a session management network element in a first communications system first receives session context request information sent from an access management network element in the first communications system. The session context request information is used to obtain a session context that is of a terminal device in the first communications system and that is corresponding to a second communications system. Next, the session management network element determines whether a dedicated quality of service flow exists in a session corresponding to the session context request, and then sends, to the access management network element, the session context in which the dedicated quality of service flow exists. In this way, if the dedicated quality of service flow does not exist in the session, the session management network element does not need to send the session context to the access management network element. Therefore, a PDN connection to the session context in which the dedicated quality of service flow does not exist does not need to be established in the second communications system, thereby reducing signaling and channel resources.

Figure 5A:
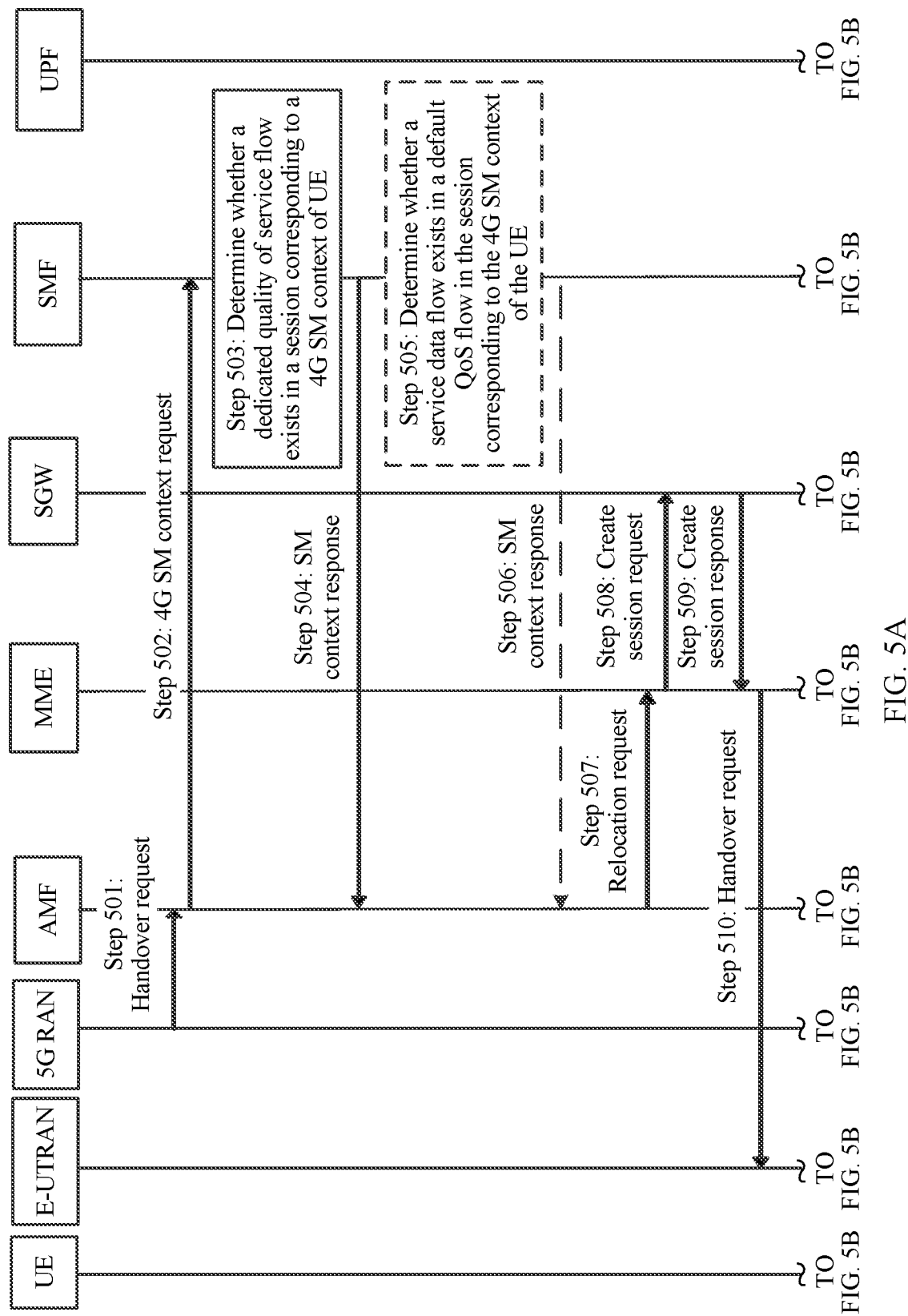
FIG. 5A and FIG. 5B are a flowchart of an interworking method according to an embodiment of this application.
Figure 5B:
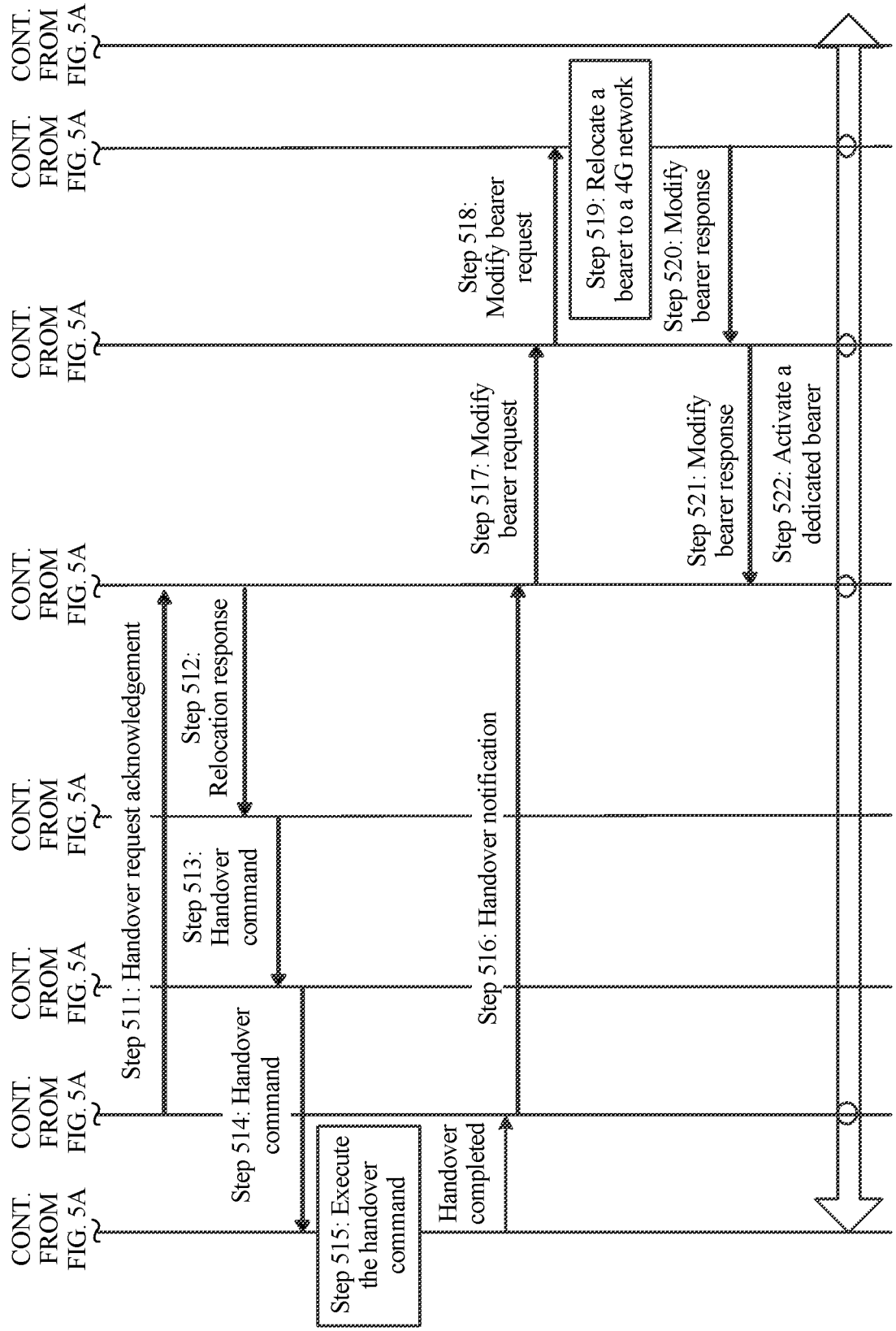

The method provided in the embodiments of this application is described below with reference to the accompanying drawings. Referring to FIG. 5A and FIG. 5B, FIG. 5A and FIG. 5B are a flowchart of an interworking method between different systems according to an embodiment of this application. The method may be applied to the interworking architecture shown in FIG. 1. A session management network element may be the SMF network element in FIG. 1, and an access management network element may be the AMF network element in FIG. 1. Certainly, if the method is applied to a different interworking architecture, the session management network element and the access management network element may also be other network elements. This is not limited herein. In the following description, an example in which the session management network element is the SMF network element and the access management network element is the AMF network element is used. The method may include the following steps.

Step 501: If determining to hand over UE from 5G to 4G, a 5G RAN sends a handover required message to an AMF network element.

In this embodiment of this application, the handover required message includes a target base station ID (Target eNB ID) and a source to target transparent container. Certainly, the handover required message may further include another parameter. This is not limited herein.

Step 502: The AMF network element receives the handover required message, and sends a 4G SM context request message to an SMF network element.

After receiving the handover required message, the AMF network element determines, based on the target eNB ID included in the handover required message, that the UE needs to be handed over from the 5G network to an E-UTRAN of the 4G network. Then the AMF network element sends the 4G SM context request message to the SMF network element, to request an EPS bearer context, namely, a 4G SM context.

It should be noted that the UE may be served by a plurality of SMFs. In this case, the AMF network element needs to send the 4G SM context request message to all the SMF network elements serving the UE. If the UE is in a roaming state, the AMF network element requests, from a virtual session management function (V-SMF) network element, a 4G SM context corresponding to the UE.

Step 503: The SMF network element receives the 4G SM context request message, and determines whether a dedicated quality of service flow (dedicated QoS flow) exists in a session corresponding to a 4G SM context of the UE.

After receiving the 4G SM context request message, the SMF network element obtains all PDU sessions corresponding to the UE, and then the SMF network element determines each PDU session, to determine whether any dedicated QoS flow, including a GBR QoS flow and a non-GBR QoS flow, other than a default QoS flow exists in the PDU session.

It should be noted that if a plurality of SMF network elements serve the UE, each SMF network element serving the UE needs to perform the foregoing determining process on all the PDU sessions corresponding to the UE.

Step 504: The SMF network element sends, to the AMF network element, a 4G SM context included in a PDU session in which the dedicated QoS flow exists.

When the SMF network element determines that the dedicated QoS flow exists in a PDU session corresponding to the UE, the SMF network element adds, to an SM context response message sent to the AMF network element, 4G SM contexts corresponding to the default QoS flow and a GBR QoS flow that are included in the PDU session. The 4G SM context includes information such as an EPS bearer ID, a QoS parameter, and an uplink/downlink TFT.

Alternatively, when the SMF network element determines that no dedicated QoS flow exists in a PDU session corresponding to the UE, the SMF network element does not add, to an SM context response message sent to the AMF network element, a 4G SM context corresponding to the default QoS flow in the PDU session. In addition, the SMF network element may further trigger a procedure for releasing the PDU session.

Step 505: The SMF network element receives the 4G SM context request message, and determines whether a service data flow (SDF) exists in a default QoS flow in the session corresponding to the 4G SM context of the UE.

After receiving the 4G SM context request message, the SMF network element obtains all the PDU sessions corresponding to the UE, and then the SMF network element determines the default QoS flow in each PDU session, to determine whether the SDF exists in the default QoS flow in the PDU session.

It should be noted that if a plurality of SMF network elements serve the UE, each SMF network element serving the UE needs to perform the foregoing determining process on default QoS flows in all the PDU sessions corresponding to the UE.

Step 506: The SMF network element sends, to the AMF network element, a 4G SM context included in a PDU session in which the SDF exists in the default QoS flow.

When the SMF network element determines that the SDF exists in the default QoS flow in a PDU session corresponding to the UE, the SMF network element adds, to the SM context response message sent to the AMF network element, a 4G SM context corresponding to the PDU session. The 4G SM context includes information such as an EPS bearer ID, a QoS parameter, and an uplink/downlink TFT.

Alternatively, when the SMF network element determines that no SDF exists in the default QoS flow in a PDU session corresponding to the UE, the SMF network element does not add, to the SM context response message sent to the AMF network element, a 4G SM context corresponding to the PDU session. In addition, the SMF network element may further trigger a procedure for releasing the PDU session.

It should be noted that the 4G SM context that is sent from the SMF network element and that is corresponding to the PDU session may be a 4G SM context selected by using the session management method in the first aspect, or may be a 4G SM context that is not selected by using the session management method in the first aspect, that is, may be all 4G SM contexts corresponding to the PDU session. This is not limited herein.

In addition, it should be noted that in a process of handing over the UE from the 5G network to the 4G network, the SMF network element may perform only step 503 and step 504, and does not perform step 505 and step 506, or may perform only step 505 and step 506, and does not perform step 503 and step 504. Alternatively, the SMF network element may perform not only step 503 and step 504, but also step 505 and step 506. This is not limited in this embodiment of this application.

In addition, it should be noted that when the SMF network element performs not only step 503 and step 504, but also step 505 and step 506, the SMF network element may perform reordering on an order of step 503 to step 506. For example, the SMF network element may first perform step 503, then perform step 505, next perform step 504, and finally perform step 506; or the SMF network element may first perform step 503 and step 505, and then simultaneously perform step 504 and step 506. This is not limited herein.

Step 507: The AMF network element receives the 4G SM context corresponding to the UE, selects an MME network element, and sends a relocation request message to the MME network element.

The relocation request message includes a target E-UTRAN Node ID, the source to target transparent container, a mapped mobility management and session management evolved packet system terminal device context (mapped MM and SM EPS UE Context) that carries default and dedicated GBR bearers, SGW addresses of a control plane and a user plane, and tunnel endpoint identifiers (TEID) of the control plane and the user plane.

Step 508: The MME network element receives the relocation request message, selects a new SGW, and sends, for each PDN connection of the UE, a create session request message to the new SGW.

In a possible implementation, the MME network element may select the new SGW based on the SGW addresses and the TEIDs of the control plane and the user plane in the relocation request message.

Step 509: The SGW receives the create session request message, allocates a local resource to each PDN connection, and returns a create session response message to the MME network element.

The local resource may be some radio parameters that are used to ensure normal service execution between the base stations, for example, may be a service handover threshold, a filtering coefficient, and the like.

Step 510: After receiving the create session response message, the MME network element sends a handover request message to a target E-UTRAN Node.

The handover request message is used to request the target E-UTRAN Node to allocate a bearer resource, and the message may include a list of EPS bearer IDs for which radio bearer resources need to be established in the target E-UTRAN Node.

Step 511: After receiving the handover request message, the target E-UTRAN Node allocates a corresponding resource to the UE, and returns a handover request acknowledge message to the MME network element.

The handover request acknowledge message includes a target to source transparent container, an EPS bearers configure list (EPS Bearers setup list), and an EPS bearers failed to configure list (EPS Bearers failed to setup list).

Step 512: After receiving the handover request acknowledge message, the MME network element sends a relocation response message to the AMF network element.

The relocation response message includes a cause value, a list of set up radio network resources (List of Set Up RABs), the EPS bearers configure list (EPS Bearers setup list), an MME tunnel endpoint identifier for control plane, a radio access network cause (RAN Cause) value, an MME address for control plane, the target to source transparent container, and address(es) and tunnel endpoint identifier(s) for data forwarding.

Step 513: After receiving the relocation response message, the AMF network element sends a handover command message to the source 5G RAN.

Step 514: The source 5G RAN forwards the handover command message to the UE.

The handover command message includes a transparent container, and the transparent container includes some radio parameters that need to be sent from the E-UTRAN Node to the source 5G RAN.

Step 515: The UE executes the handover command.

After receiving the handover command, the UE executes the command to associate an allocated EPS bearer ID with a corresponding QoS flow, and delete a QoS flow that is not associated with an EPS bearer ID. In this case, the UE may send a handover complete message to the 5G RAN, to complete network handover.

Step 516: When the UE successfully accesses the target E-UTRAN Node, the target E-UTRAN Node sends a handover notify message to the MME network element.

Step 517: For all bearers in each established session connection in the UE, the MME network element sends a modify bearer request message to the SGW.

Step 518: The SGW sends the modify bearer request to the SMF network element for each PDN connection.

Specifically, step 518 is mainly divided into two steps: First, the SGW finds a corresponding PDN gateway (PGW) based on an SMF network element address from the MME network element. In this step, the SGW sends an allocated TEID (including a control plane TEID and a user plane TEID) to the PGW, and a control plane gateway of the SMF network element (SMF PDN gateway-Control plane, SMF+PGW-C) reserves the control plane TEID of the SGW. Then the SMF network element sends the user plane TEID of the SGW to a UPF network element by using an Sx session modification procedure.

Step 519: The SMF network element executes the modify bearer request, and relocates a bearer to the 4G network.

Specifically, the control plane gateway of the SMF network element (SMF PDN gateway-Control plane, SMF+PGW-C) locally deletes a QoS flow to which an EPS bearer ID is not allocated. Because the default QoS flow has a "match all" filter, the PGW maps an IP flow of the deleted QoS flow to the default QoS flow.

Step 520: The SMF sends a modify bearer response message to the SGW.

In this way, a user plane that is for each of a default bearer and a GBR dedicated bearer and that is between the UE, the target E-UTRAN Node, the SGW, and the SMF network element is established.

Step 521: The SGW sends the modify bearer response message to the MME network element.

Step 522: The SMF network element initiates a dedicated bearer activation procedure for a non-GBR QoS flow, to re-establish a non-GBR dedicated bearer corresponding to the non-GBR QoS flow.

It should be noted that if dynamic PCC is deployed in a PCF, this step may be initiated by the PCF network element.

In the foregoing handover process, when an access management network element requests, from a session management network element, an SM context corresponding to a second communications system, for a PDU session in which no dedicated QoS flow exists, the session management network element does not send, to the access management network element, an SM context corresponding to a default QoS flow in the PDU session, so as to avoid establishing a corresponding PDN connection on the second communications system side, thereby reducing signaling and channel resources.

Figure 6:
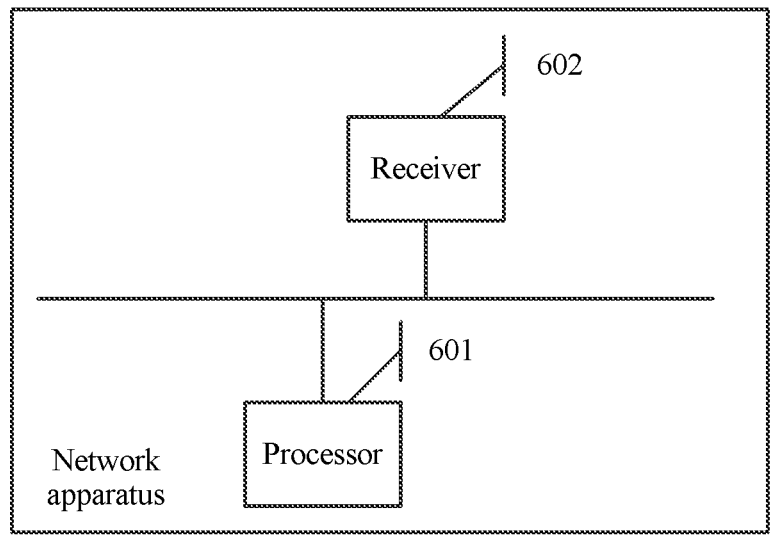
FIG. 6 to FIG. 13 are structural diagrams of a network apparatus according to an embodiment of this application.

Based on the foregoing embodiments, an embodiment of this application further provides a network apparatus. The network apparatus may implement corresponding steps performed by a session management network element in the embodiment shown in FIG. 2 to FIG. 4A and FIG. 4B. Referring to FIG. 6, a network apparatus 600 includes a processor 601.

The processor 601 may be a central processing unit (CPU) or an application-specific integrated circuit (ASIC), may be one or more integrated circuits configured to control program execution, or may be a baseband chip, or the like.

The network apparatus may further include a memory, and the memory may be connected to the processor 601 by using a bus structure, a star structure, or another structure. There may be one or more memories. The memory may be a read-only memory (ROM), a random access memory (RAM), a magnetic disk memory, or the like. The memory may be configured to store program code required by the processor 601 to execute a task, and the memory may be further configured to store data.

The processor 601 is configured to: when establishing a guaranteed bit rate GBR flow of a terminal device in a first communications system, determine, by the network apparatus in the first communications system, that the GBR flow is a GBR flow required for handing over the terminal device from the first communications system to a second communications system; and establish, for the GBR flow, a session context corresponding to the second communications system.

In a possible implementation, the processor 601 is specifically configured to:

determine, based on at least one of a policy and charging control PCC rule, an operator policy, and a data network name DNN, that the GBR flow is the GBR flow required for handing over the terminal device from the first communications system to the second communications system.

In a possible implementation, the network apparatus further includes a receiver 602. The receiver 602 may be connected to the processor 601 by using a bus structure, a star structure, or another structure, or may be connected to the processor 601 by using a dedicated connection cable.

The receiver 602 is specifically configured to:

receive PCC rule information sent from the policy control network element, where the PCC rule information includes a PCC rule that is of the GBR flow and that is corresponding to the second communications system.

The processor 601 is specifically configured to:

determine, based on the PCC rule information, that the GBR flow is the GBR flow required for handing over the terminal device from the first communications system to the second communications system.

In a possible implementation, the receiver 602 is further configured to receive service information sent from the terminal device.

The processor 601 is specifically configured to:

determine, based on the service information, the operator policy, and the data network name DNN, that the GBR flow is the GBR flow required for handing over the terminal device from the first communications system to the second communications system.

In a possible implementation, the PCC rule includes a GBR parameter, a multiple frequency band indicator MBR parameter, and an IP filter.

Code corresponding to the foregoing session management method is built into a chip by designing and programming the processor 601 and the receiver 602, so that the chip can perform the foregoing session management method when running. How to design and program the processor 601 and the receiver 602 is a technology well known to a person skilled in the art, and details are not described herein again.

Figure 7:
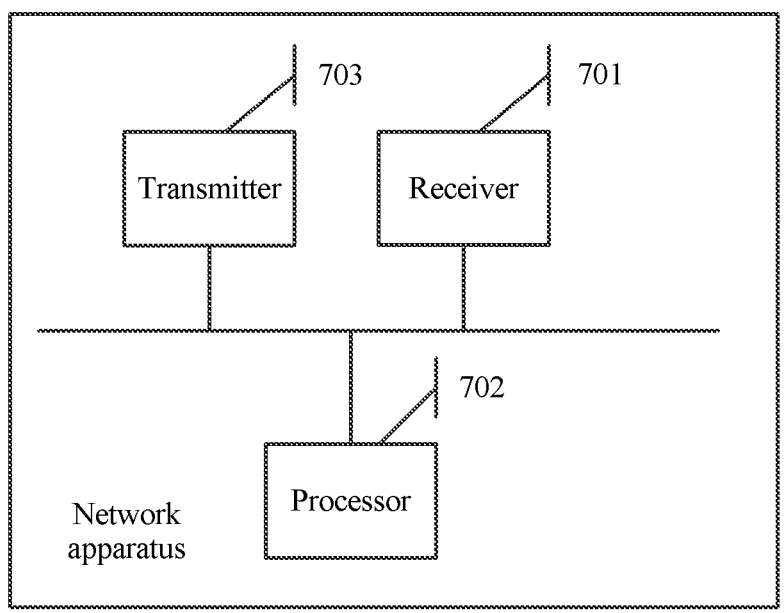

Based on the foregoing embodiments, an embodiment of this application further provides a network apparatus. The network apparatus may implement corresponding steps performed by a policy control network element in the embodiment shown in FIG. 2 to FIG. 4A and FIG. 4B. Referring to FIG. 7, the network apparatus 700 includes a receiver 701, a processor 702, and a transmitter 703.

The processor 702 may be a central processing unit (CPU) or an application-specific integrated circuit (ASIC), may be one or more integrated circuits configured to control program execution, or may be a baseband chip, or the like.

The receiver 701 and the transmitter 703 may be connected to the processor 702 by using a bus structure, a star structure, or another structure, or may be separately connected to the processor 702 by using a dedicated connection cable.

The network apparatus may further include a memory, and the memory may be connected to the processor 702 by using a bus structure, a star structure, or another structure. There may be one or more memories. The memory may be a read-only memory (ROM), a random access memory (RAM), a magnetic disk memory, or the like. The memory may be configured to store program code required by the processor 702 to execute a task, and may be further configured to store data.

The receiver 701 is configured to receive service information from a terminal device or an application network element.

The processor 702 is configured to generate policy and charging control PCC rule information based on at least one of an operator policy and a data network name DNN, the service information, and an interworking capability of the terminal device from a first communications standard network to a second communications standard network. The PCC rule information includes at least a PCC rule that is of the GBR flow and that is corresponding to a first communications system. The first communications system uses the first communications standard network, and a second communications system uses the second communications standard network.

The transmitter 703 is configured to send the PCC rule to a session management network element.

In a possible implementation, the PCC rule includes a GBR parameter, a multiple frequency band indicator MBR parameter, and an IP filter.

Code corresponding to the foregoing session management method is built into a chip by designing and programming the receiver 701, the processor 702, and the transmitter 703, so that the chip can perform the foregoing session management method when running. How to design and program the receiver 701, the processor 702, and the transmitter 703 is a technology well known to a person skilled in the art, and details are not described herein again.

Figure 8:
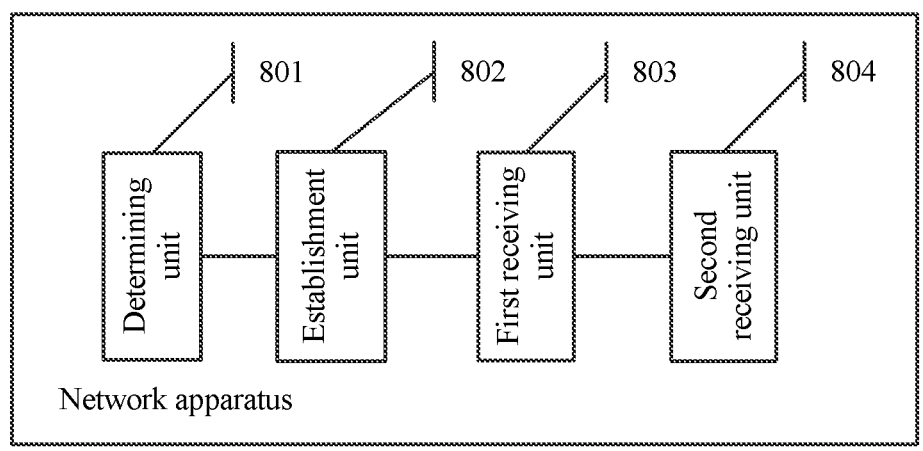

Based on the foregoing embodiments, an embodiment of this application further provides a network apparatus. The network apparatus may implement corresponding steps performed by a session management network element in the embodiment shown in FIG. 2 to FIG. 4A and FIG. 4B. Referring to FIG. 8, the network apparatus 800 includes a determining unit 801 and an establishment unit 802.

In actual application, network element devices corresponding to the determining unit 801 and the establishment unit 802 may be the processor 601 in FIG. 6.

The determining unit 801 is configured to: when establishing a guaranteed bit rate GBR flow of a terminal device in a first communications system, determine, by the network apparatus in the first communications system, that the GBR flow is a GBR flow required for handing over the terminal device from the first communications system to a second communications system.

The establishment unit 802 is configured to establish, for the GBR flow, a session context corresponding to the second communications system.

In a possible implementation, the determining unit 801 is specifically configured to:

determine, based on at least one of a policy and charging control PCC rule, an operator policy, and a data network name DNN, that the GBR flow is the GBR flow required for handing over the terminal device from the first communications system to the second communications system.

In a possible implementation, the network apparatus further includes:

a first receiving unit 803, configured to receive PCC rule information sent from the policy control network element, where the PCC rule information includes a PCC rule that is of the GBR flow and that is corresponding to the second communications system.

The determining unit 801 is specifically configured to:

determine, based on the PCC rule information, that the GBR flow is the GBR flow required for handing over the terminal device from the first communications system to the second communications system.

In a possible implementation, the network apparatus further includes:

a second receiving unit 804, configured to receive service information sent from the terminal device.

The determining unit 801 is specifically configured to:

determine, based on the service information, the operator policy, and the data network name DNN, that the GBR flow is the GBR flow required for handing over the terminal device from the first communications system to the second communications system.

In a possible implementation, the PCC rule includes a GBR parameter, a multiple frequency band indicator MBR parameter, and an IP filter.

Figure 9:
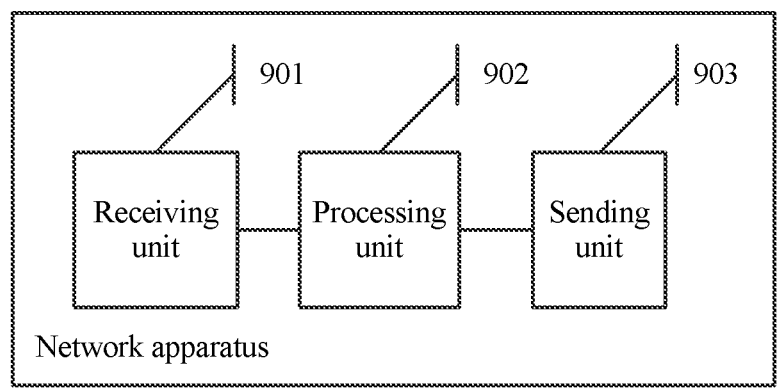

Based on the foregoing embodiments, an embodiment of this application further provides a network apparatus. The network apparatus may implement corresponding steps performed by a policy control network element in the embodiment shown in FIG. 2 to FIG. 4A and FIG. 4B. Referring to FIG. 9, the network apparatus 900 includes a receiving unit 901, a processing unit 902, and a sending unit 903.

In actual application, a network element device corresponding to the receiving unit 901 may be the receiver 701 in FIG. 7, a network element device corresponding to the processing unit 902 may be the processor 702 in FIG. 7, and a network element device corresponding to the sending unit 903 may be the transmitter 703 in FIG. 7.

The receiving unit 901 is configured to receive service information from a terminal device or an application network element.

The processing unit 902 is configured to generate policy and charging control PCC rule information based on at least one of an operator policy and a data network name DNN, the service information, and an interworking capability of the terminal device from a first communications standard network to a second communications standard network. The PCC rule information includes at least a PCC rule that is of the GBR flow and that is corresponding to a first communications system. The first communications system uses the first communications standard network, and a second communications system uses the second communications standard network.

The sending unit 903 is configured to send the PCC rule to a session management network element.

In a possible implementation, the PCC rule includes a GBR parameter, a multiple frequency band indicator MBR parameter, and an IP filter.

In the foregoing technical solution, the network apparatus selects a GBR QoS flow in a GBR QoS flow establishment process, to ensure that an SM context corresponding to the second communications system is allocated to only a GBR QoS flow that needs to be handed over to the second communications system, and an SM context corresponding to the second communications system is not established for a GBR QoS flow that does not need to be handed over to the second communications system. Correspondingly, the network apparatus does not need to maintain the SM context that is corresponding to the second communications system and that is of the GBR QoS flow that does not need to be handed over to the second communications system.

Figure 10:
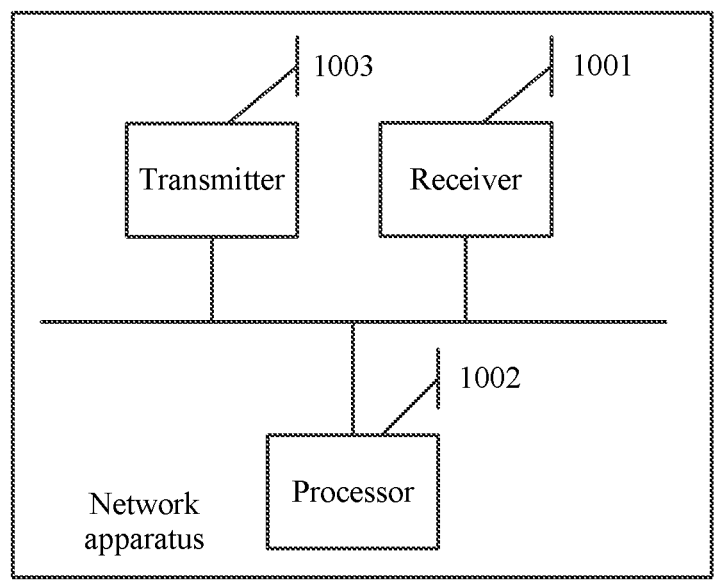

Based on the foregoing embodiments, an embodiment of this application further provides a network apparatus. The network apparatus may implement corresponding steps performed by a session management network element in the embodiment shown in FIG. 5A and FIG. 5B. Referring to FIG. 10, the network apparatus 1000 includes a receiver 1001, a processor 1002, and a transmitter 1003.

The processor 1002 may be a central processing unit (CPU) or an application-specific integrated circuit (ASIC), may be one or more integrated circuits configured to control program execution, or may be a baseband chip, or the like.

The receiver 1001 and the transmitter 1003 may be connected to the processor 1002 by using a bus structure, a star structure, or another structure, or may be separately connected to the processor 1002 by using a dedicated connection cable.

The network apparatus may further include a memory, and the memory may be connected to the processor 1002 by using a bus structure, a star structure, or another structure. There may be one or more memories. The memory may be a read-only memory (ROM), a random access memory (RAM), a magnetic disk memory, or the like. The memory may be configured to store program code required by the processor 1002 to execute a task, and may be further configured to store data.

The receiver 1001 is configured to receive session context request information sent from an access management network element in a first communications system, where the session context request information is used to obtain a session context that is of a terminal device in the first communications system and that is corresponding to a second communications system, and the network apparatus is in the first communications system.

The processor 1002 is configured to determine that a dedicated quality of service flow exists in a session corresponding to the session context request.

The transmitter 1003 is configured to send, to the access management network element in the first communications system, the session context corresponding to the session in which the dedicated quality of service flow exists.

In a possible implementation, the processor 1002 is further configured to:

determine that the dedicated quality of service flow does not exist in the session corresponding to the session context request; and release the session in which the dedicated quality of service flow does not exist.

In a possible implementation, the processor 1002 is further configured to:

determine that no service data flow SDF exists in a default quality of service flow in the session corresponding to the session context request; and release the session in which no SDF exists in the default quality of service flow.

In a possible implementation, the processor 1002 is further configured to:

determine that a service data flow SDF exists in the default quality of service flow in the session corresponding to the session context request.

The transmitter 1003 is further configured to:

send, to the access management network element in the first communications system, the session context corresponding to the session in which the SDF exists.

Code corresponding to the foregoing session management method is built into a chip by designing and programming the receiver 1001, the processor 1002, and the transmitter 1003, so that the chip can perform the foregoing session management method when running. How to design and program the receiver 1001, the processor 1002, and the transmitter 1003 is a technology well known to a person skilled in the art, and details are not described herein again.

Figure 11:
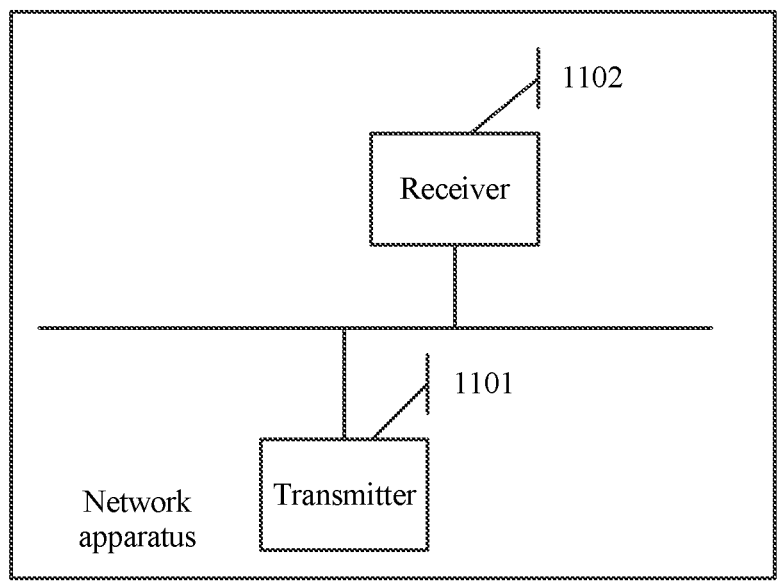

Based on the foregoing embodiments, an embodiment of this application further provides a network apparatus. The network apparatus may implement corresponding steps performed by an access management network element in the embodiment shown in FIG. 5A and FIG. 5B. Referring to FIG. 11, the network apparatus 1100 includes a transmitter 1101 and a receiver 1102.

The transmitter 1101 and the receiver 1102 may be independent of each other, or may be integrated together. If the network apparatus is connected to another device in a wireless manner, the transmitter 1101 and the receiver 1102 may be radio frequency circuits. If the network apparatus is connected to another device in a wired manner, the transmitter 1101 may be a transmit port, and the receiver 1102 may be a receive port.

The transmitter 1101 is configured to:

send session context request information to a session management network element in a first communications system, where the session context request information is used to obtain a session context that is of a terminal device in the first communications system and that is corresponding to a second communications system.

The receiver 1102 is configured to:

receive the session context sent from the session management network element, where a dedicated quality of service flow exists in a session corresponding to the session context.

Code corresponding to the foregoing interworking method is built into a chip by designing and programming the transmitter 1101 and the receiver 1102, so that the chip can perform the foregoing interworking method when running. How to design and program the transmitter 1101 and the receiver 1102 is a technology well known to a person skilled in the art, and details are not described herein again.

Figure 12:
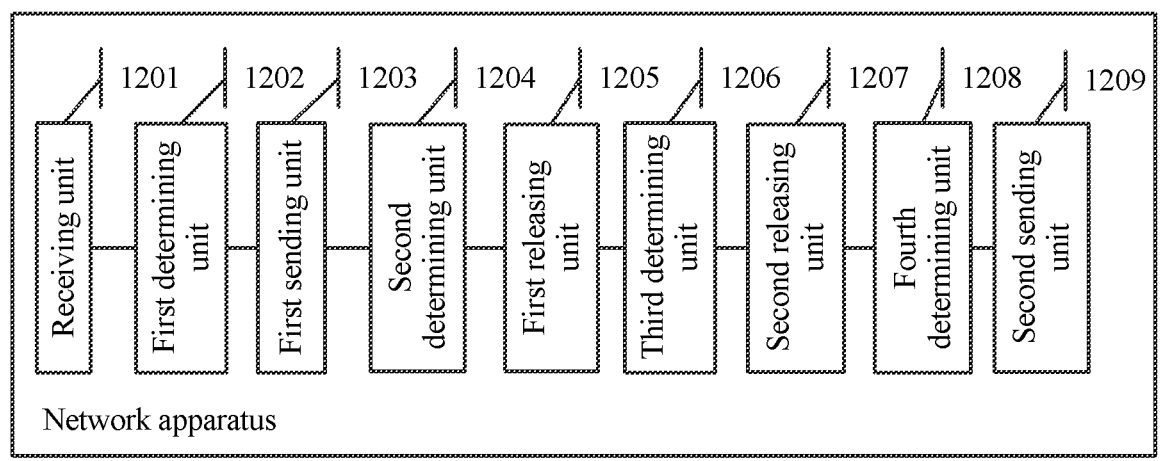

Based on the foregoing embodiments, an embodiment of this application further provides a network apparatus. The network apparatus may implement corresponding steps performed by a session management network element in the embodiment shown in FIG. 5A and FIG. 5B. Referring to FIG. 12, the network apparatus 1200 includes a receiving unit 1201, a first determining unit 1202, and a first sending unit 1203.

In actual application, a network element device corresponding to the receiving unit 1201 may be the receiver 1001 in FIG. 10, a network element device corresponding to the first determining unit 1202 may be the processor 1002 in FIG. 10, and a network element device corresponding to the first sending unit 1203 may be the transmitter 1003 in FIG. 10.

The receiving unit 1201 is configured to receive session context request information sent from an access management network element in a first communications system, where the session context request information is used to obtain a session context that is of a terminal device in the first communications system and that is corresponding to a second communications system, and the network apparatus is in the first communications system.

The first determining unit 1202 is configured to determine that a dedicated quality of service flow exists in a session corresponding to the session context request.

The first sending unit 1203 is configured to send, to the access management network element in the first communications system, the session context corresponding to the session in which the dedicated quality of service flow exists.

In a possible implementation, the network apparatus further includes:

a second determining unit 1204, configured to determine that the dedicated quality of service flow does not exist in the session corresponding to the session context request; and a first releasing unit 1205, configured to release the session in which the dedicated quality of service flow does not exist.

In a possible implementation, the network apparatus further includes:

a third determining unit 1206, configured to determine that no service data flow SDF exists in a default quality of service flow in the session corresponding to the session context request; and a second releasing unit 1207, configured to release the session in which no SDF exists in the default quality of service flow.

In a possible implementation, the network apparatus further includes:

a fourth determining unit 1208, configured to determine that a service data flow SDF exists in the default quality of service flow in the session corresponding to the session context request; and a second sending unit 1209, configured to send, to the access management network element in the first communications system, the session context corresponding to the session in which the SDF exists.

Figure 13:
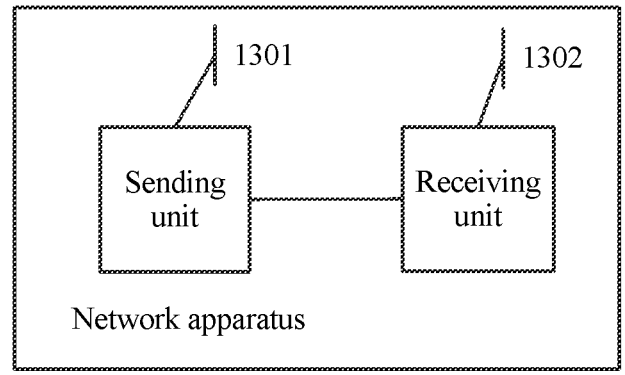

Based on the foregoing embodiments, an embodiment of this application further provides a network apparatus. The network apparatus may implement corresponding steps performed by an access management network element in the embodiment shown in FIG. 5A and FIG. 5B. Referring to FIG. 13, the network apparatus 1300 includes a sending unit 1301 and a receiving unit 1302.

In actual application, a network element device corresponding to the sending unit 1301 may be the transmitter 1101 in FIG. 11, and a network element device corresponding to the receiving unit 1302 may be the receiver 1102 in FIG. 11.

the sending unit 1301 is configured to send session context request information to a session management network element in a first communications system, where the session context request information is used to obtain a session context that is of a terminal device in the first communications system and that is corresponding to a second communications system.

The receiving unit 1302 is configured to receive the session context sent from the session management network element, where a dedicated quality of service flow exists in a session corresponding to the session context.

The network apparatus provided in this application may be a chip system, and the chip system may include at least one chip, and may further include another discrete component. The chip system may be disposed in the network apparatus, and supports the network apparatus in completing the session management method or the interworking method provided in the embodiments of this application.

An embodiment of this application provides a computer storage medium, and the computer storage medium stores an instruction. When the instruction runs on a computer, the computer performs the session management method or the interworking method.

An embodiment of this application provides a computer program product, and the computer program product stores an instruction. When the instruction runs on a computer, the computer performs the session management method or the interworking method.

In the foregoing technical solutions, after the network apparatus in the first communications system receives the session context request information used to obtain the session context that is of the terminal device in the first communications system and that is corresponding to the second communications system, the network apparatus determines whether the dedicated quality of service flow exists in the session corresponding to the session context request, and then establishes a PDN connection in the second communications system for the terminal device based on that the session context in which the dedicated quality of service flow exists. In this way, if the dedicated quality of service flow does not exist in the session context, a PDN connect to the session context in which the dedicated quality of service flow does not exist does not need to be established in the second communications system.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   when establishing a guaranteed bit rate (GBR) flow of a terminal device in a fifth generation (5G) communications system, determining, by a session management network element in the 5G communications system based on a quality of service (QoS) parameter and an operator policy, that the GBR flow is a GBR flow required for handing over the terminal device from the 5G communications system to a fourth generation (4G) communications system, wherein determining that the GBR flow is a GBR flow required for handing over the terminal device from the 5G communications system to the 4G communications system comprises determining that a service type corresponding to the GBR flow is a service type supported by an operator policy of the 4G communications system; and
   establishing, by the session management network element for the GBR flow, a session context corresponding to the 4G communications system, wherein establishing the session context corresponding to the 4G communications system comprises establishing a bearer ID in the 4G communications system for the GBR flow.

2. The method according to claim 1, further comprising:
   sending, by the session management network element to an access and mobility management function (AMF) network element, information for allocating the bearer ID in the 4G communications system for the GBR flow; and
   obtaining, by the session management network element from the AMF network element, the bearer ID allocated by the AMF network element;
   wherein the session context comprises the bearer ID.

3. The method according to claim 2, further comprising:
   allocating, by the session management network element, a QoS parameter in the 4G communications system for the GBR flow;
   wherein the session context further comprises the QoS parameter in the 4G communications system.

4. The method according to claim 1, further comprising:
   determining, by the session management network element, that the GBR flow needs to be established.

5. The method according to claim 1, wherein the method further comprises:
   receiving, by the session management network element, policy and charging control (PCC) rule information from a policy control network element, the PCC rule information comprising a PCC rule that is of the GBR flow and that corresponds to the 4G communications system, the PCC rule comprising the QoS parameter.

6. An apparatus in a fifth generation (5G) communications system, comprising:
   a memory storage comprising instructions; and one or more processors in communication with the memory, wherein the one or more processors are configured to execute the instructions to facilitate the following being performed by the apparatus:

when establishing a guaranteed bit rate (GBR) flow of a terminal device in the 5G communications system, determining, based on a quality of service (QoS) parameter and an operator policy, that the GBR flow is a GBR flow required for handing over the terminal device from the 5G communications system to a fourth generation (4G) communications system, wherein determining that the GBR flow is a GBR flow required for handing over the terminal device from the 5G communications system to the 4G communications system comprises determining that a service type corresponding to the GBR flow is a service type supported by an operator policy of the 4G communications system; and establishing a session context corresponding to the 4G communications system for the GBR flow, wherein establishing the session context corresponding to the 4G communications system comprises establishing a bearer ID in the 4G communications system for the GBR flow.

7. The apparatus according to claim 6, wherein the one or more processors are further configured to execute the instructions to facilitate the following being performed by the apparatus:

sending, to an access and mobility management function (AMF) network element, information for allocating the bearer ID in the 4G communications system for the GBR flow; and obtaining, from the AMF network element, the bearer ID allocated by the AMF network element;

wherein the session context comprises the bearer ID.

8. The apparatus according to claim 7, wherein the one or more processors are further configured to execute the instructions to facilitate the following being performed by the apparatus:

allocating a QoS parameter in the 4G communications system for the GBR flow;

wherein the session context further comprises the QoS parameter in the 4G communications system.

9. The apparatus according to claim 6, wherein the one or more processors are further configured to execute the instructions to facilitate the following being performed by the apparatus:

determining that the GBR flow needs to be established.

10. A method, comprising:

when establishing a guaranteed bit rate (GBR) flow of a terminal device in a fifth generation (5G) communications system, determining, by a session management network element in the 5G communications system based on a quality of service (QoS) parameter and an operator policy, that the GBR flow is a GBR flow required for handing over the terminal device from the 5G communications system to a fourth generation (4G) communications system, wherein determining that the GBR flow is a GBR flow required for handing over the terminal device from the 5G communications system to the 4G communications system comprises determining that a service type corresponding to the GBR flow is a service type supported by an operator policy of the 4G communications system;

sending, by the session management network element to an access and mobility management function (AMF) network element, information for allocating a bearer ID in the 4G communications system for the GBR flow;

allocating, by the AMF network element, the bearer ID for the GBR flow; and obtaining, by the session management network element from the AMF network element, the bearer ID allocated by the AMF network element.

11. The method according to claim 10, further comprising:

establishing, by the session management network element for the GBR flow, a session context corresponding to the 4G communications system, the session context comprising the bearer ID.

12. The method according to claim 11, further comprising:

allocating, by the session management network element, a QoS parameter in the 4G communications system for the GBR flow;

wherein the session context further comprises the QoS parameter in the 4G communications system.

13. The method according to claim 10, further comprising:

determining, by the session management network element, that the GBR flow needs to be established.

14. A fifth generation (5G) communications system, comprising:

a session management network element; and an access and mobility management function (AMF);

wherein the session management network element is configured to:

when establishing a guaranteed bit rate (GBR) flow of a terminal device in the 5G communications system, determine, based on a quality of service (QoS) parameter and an operator policy, that the GBR flow is a GBR flow required for handing over the terminal device from the first communications system to a fourth generation (4G) communications system, wherein determining that the GBR flow is a GBR flow required for handing over the terminal device from the 5G communications system to the 4G communications system comprises determining that a service type corresponding to the GBR flow is a service type supported by an operator policy of the 4G communications system; and send, to the AMF network element, information for allocating a bearer ID in the 4G communications system for the GBR flow;

wherein the AMF network element is configured to allocate the bearer ID for the GBR flow; and wherein the session management network element is further configured to obtain the bearer ID allocated by the AMF network element.

15. The 5G communications system according to claim 14, wherein the session management network element is further configured to establish for the GBR flow a session context corresponding to the 4G communications system, the session management network element establishing the session context for the GBR flow, the session context comprising the bearer ID.

16. The 5G communications system according to claim 15, wherein the session management network element is further configured to allocate a QoS parameter in the 4G communications system for the GBR flow, the session context further comprising the QoS parameter in the 4G communications system.

17. The 5G communications system according to claim 14, wherein the session management network element is further configured to determine that the GBR flow needs to be established.

18. A non-transitory computer-readable medium having processor-executable instructions stored thereon, wherein the processor-executable instructions, when executed, facilitate:

when establishing a guaranteed bit rate (GBR) flow of a terminal device in a fifth generation (5G) communications system, determining, by a session management network element in the 5G communications system based on a quality of service (QoS) parameter and an operator policy, that the GBR flow is a GBR flow required for handing over the terminal device from the 5G communications system to a fourth generation (4G) communications system, wherein determining that the GBR flow is a GBR flow required for handing over the terminal device from the 5G communications system to the 4G communications system comprises determining that a service type corresponding to the GBR flow is a service type supported by an operator policy of the 4G communications system; and establishing, by the session management network element for the GBR flow, a session context corresponding to the 4G communications system, wherein establishing the session context corresponding to the 4G communications system comprises establishing a bearer ID in the 4G communications system for the GBR flow.

* * * * *